(12) United States Patent
Brandwijk

(10) Patent No.: US 9,956,494 B2
(45) Date of Patent: May 1, 2018

(54) ELEMENT COMPRISING SENSORS FOR DETECTING GRAB MOTION OR GRAB RELEASE MOTION FOR ACTUATING INTER-ELEMENT HOLDING OR RELEASING

(71) Applicant: RnD by Us B.V., Bilthoven (NL)

(72) Inventor: Arie Arie Quirinus Bastiaan Brandwijk, Bilthoven (NL)

(73) Assignee: RnD by Us B.V., Bilthoven (NL)

( * ) Notice: Subject to any disclaimer, the term of this patent is extended or adjusted under 35 U.S.C. 154(b) by 637 days.

(21) Appl. No.: 14/203,503

(22) Filed: Mar. 10, 2014

(65) Prior Publication Data

US 2014/0273730 A1    Sep. 18, 2014

Related U.S. Application Data

(63) Continuation-in-part of application No. 13/843,340, filed on Mar. 15, 2013, and a continuation of application No. 14/052,435, filed on Oct. 11, 2013.

(51) Int. Cl.
*B25J 9/08* (2006.01)
*A63H 33/04* (2006.01)
(Continued)

(52) U.S. Cl.
CPC .......... *A63H 33/04* (2013.01); *A63H 33/042* (2013.01); *B25J 9/08* (2013.01); *B25J 9/1617* (2013.01);
(Continued)

(58) Field of Classification Search
CPC .................................. B25J 9/16; B25J 9/1617
See application file for complete search history.

(56) References Cited

U.S. PATENT DOCUMENTS 4,526,372 A   7/1985  Kikis
4,608,525 A   8/1986  Mori et al.
(Continued)

FOREIGN PATENT DOCUMENTS

EP   0129853 A1   1/1985
GB   2287045 A    9/1995
(Continued)

OTHER PUBLICATIONS

"Communication System of Cellular Robot: CEBOT", T. Fukuda et al., Industrial Electronics Society, 1989. IECON '89., 15th Annual Conference of IEEE, pp. 634-639 vol. 3, (1989).*
(Continued)

*Primary Examiner* — James S McClellan
*Assistant Examiner* — Syvila Weatherford
(74) *Attorney, Agent, or Firm* — Jordan IP Law, LLC; Todd A. Vaughn

(57) ABSTRACT

An element having a holding mechanism, adapted for interacting with a functionally aligned holding mechanism of a similar element, and including a holding state and a released state. The holding mechanism in the holding state is engaged with the aligned holding mechanism of the similar element for holding the element positioned with respect to the similar element. The holding element in the released state is disengaged with the aligned holding mechanism. The element also includes a sensing mechanism for providing grab-detection, the grab-detection including detection of an action leading to a grip of the element, having a grip on the element, an action of releasing a grip of the element, and a combination thereof. The sensing mechanism is functionally coupled to the holding mechanism for upon the grab-detection actuating at least one of the functionally aligned holding mechanism between the holding state and the released state.

23 Claims, 19 Drawing Sheets

(51) Int. Cl.
*B25J 9/16* (2006.01)
*A63F 9/08* (2006.01)

(52) U.S. Cl.
CPC .... *A63F 9/088* (2013.01); *G05B 2219/39163* (2013.01); *G05B 2219/40302* (2013.01)

(56) References Cited

U.S. PATENT DOCUMENTS

| | | |
|---|---|---|
| 5,016,540 A | 5/1991 | Barber |
| 5,232,154 A | 8/1993 | Jenkins et al. |
| 6,157,872 A | 12/2000 | Michael |
| 6,241,248 B1 | 6/2001 | Winter |
| 6,487,454 B1 | 11/2002 | Tymes |
| 6,520,641 B1 | 2/2003 | Walton et al. |
| 7,832,729 B2 | 11/2010 | Park |
| 8,387,989 B2 | 3/2013 | Baum |
| 2002/0196250 A1 | 12/2002 | Anderson et al. |
| 2006/0155388 A1 | 7/2006 | Pietrzyk |
| 2009/0155388 A1 | 6/2009 | Olalde |
| 2009/0184467 A1 | 7/2009 | Henderson |
| 2014/0031980 A1 | 1/2014 | Gutmann et al. |
| 2014/0213140 A1 | 7/2014 | Goh et al. |

FOREIGN PATENT DOCUMENTS

| | | | |
|---|---|---|---|
| GB | 2424510 A | 9/2006 | |
| WO | WO 9523676 A1 * | 9/1995 | ........... A63H 33/042 |
| WO | 2004/062759 A1 | 7/2004 | |
| WO | 2013183328 A1 | 12/2013 | |

OTHER PUBLICATIONS

"Dynamically reconfigurable robotic system", T. Fukuda et al., Robotics and Automation, 1988. Preceedings., 1988 IEEE International Conference on, pp. 1581-1586 vol. 3, (1988).*

"Self-Organizing robotic systems—organization and evolution of group behavior in cellular robotic system", T. Fukuda et al. From Perception to Action Conference, 1994., Proceedings, pp. 24-35 (1994).*

Yousuke Suzuki, Norio Inou, Hitoshi Kimura, Michihiko Koseki, Reconfigurable group robots adaptively transforming a mechanical structure—Crawl motion and adaptive transformation with new algorithms, Oct. 2006, Tokyo Institute of Technology, Tokyo, Japan.

Yousuke Suzuki, Norio Inou, Hitoshi Kimura, Michihiko Koseki, Reconfigurable group robots adaptively transforming a mechanical structure—Numerical expression of criteria for structural transformation and automatic motion planning method, Oct. 2007, Tokyo Institute of Technology, Tokyo, Japan.

Yousuke Suzuki, Norio Inou, Hitoshi Kimura, Michihiko Koseki, Self-Reconfigurable Modular Robots Adaptively Transforming a Mechanical Structure: Algorithm for Adaptive Transformation to Load Condition, Oct. 2011, Hindawi Publishing Corporation, Tokyo, Japan.

International Preliminary Report on Patentability for International Patent Application No. PCT/NL2014/050154, dated Feb. 27, 2015, 6 pages.

* cited by examiner

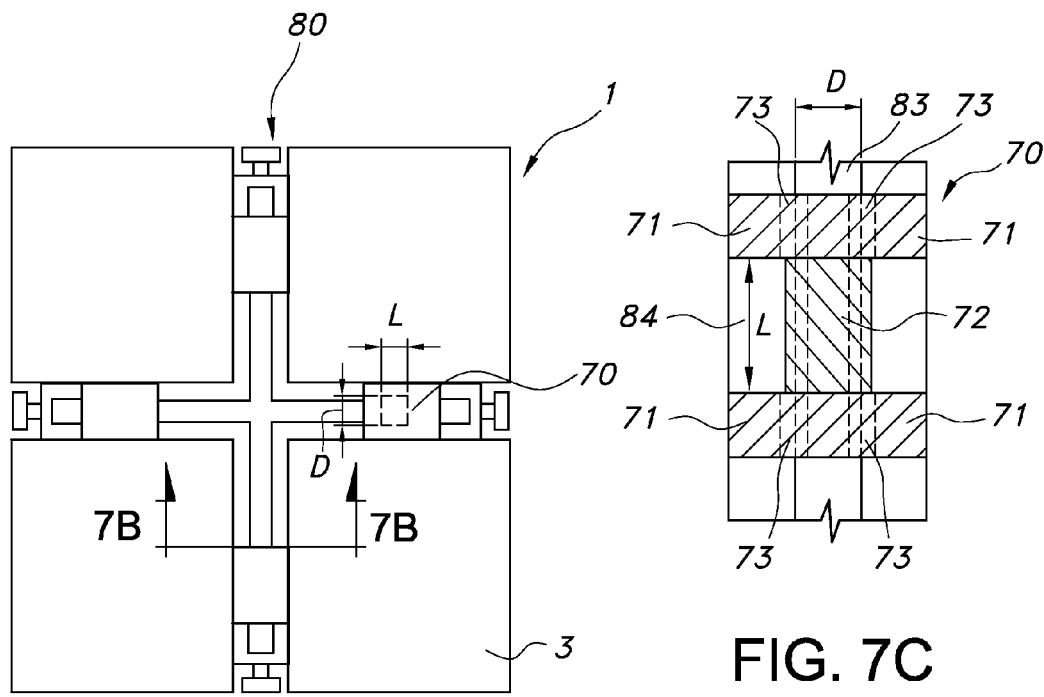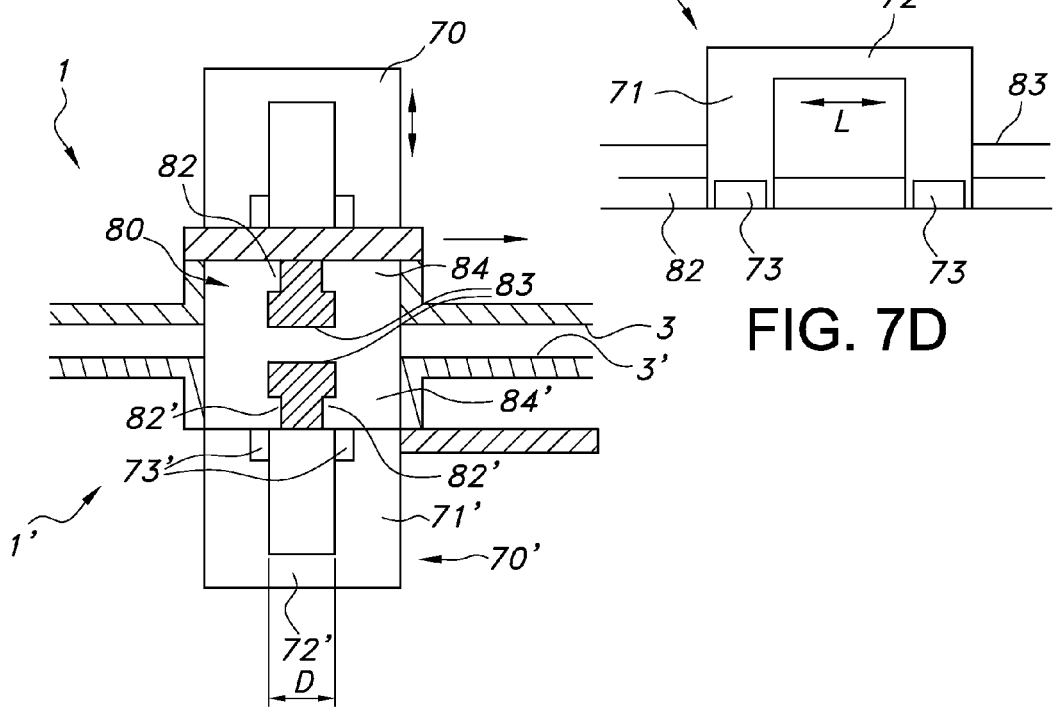

ELEMENT COMPRISING SENSORS FOR DETECTING GRAB MOTION OR GRAB RELEASE MOTION FOR ACTUATING INTER-ELEMENT HOLDING OR RELEASING

CROSS-REFERENCE TO RELATED APPLICATIONS

This application is a continuation-in-part of U.S. patent application Ser. No. 13/843,340 (filed Mar. 15, 2013) and Ser. No. 14/052,435 (filed Oct. 11, 2013), which are each hereby incorporated by reference in their respective entireties.

TECHNICAL FIELD

Embodiments relate to an element comprising sensors, and an assembly of these elements.

BACKGROUND

Since the history of man, people are making constructions of all kinds. In order to make constructing easier, a construction was divided into elements. These elements were standardized to make production easier. Examples of this standardisation are, for buildings for instance, bricks for building a house, beams and roof tiles, and more recently concrete parts like floor panels, windows, but also doors and other parts of a building. This concept of standardized parts is also used for other types of constructions, like cars, computers, and, in fact, all industrially produced constructions.

A problem with most of these elements is that they require handling. Furthermore, the elements are used for a specific construction, or a specific use, like toys. Furthermore, often the known elements are not reusable.

In "Reconfigurable group robots adaptively transforming a mechanical structure", by Yousuke Suzuki, Norio Inou, Hitishi Kimura, Michihiko Koseki, Proc. Of the 2006 IEEE/ RSJ, Oct. 9-15, 2006, Beijing, China, "group robots adaptively construct a mechanical structure" are described. "The feature of the robots is high rigidity by adopting sliding mechanisms. [.] discussed algorithms of crawl motion and adaptive construction considering mechanical constraints of the robots. The proposed algorithm is based on local communication of the robots. [.] a scheme of a temporary leader which is autonomously specified by form of the structure. The scheme decreases amount of information in communication between the robots." A proposed motion module allows only a limited mobility of the proposed robots.

In 'Design of the ATRON lattice-based self-reconfigurable robot', Esben Hallundbeak Oestergaard, Kristiaan Kassow, Richard Bek, Henrik Hautop Lund, Auton Robot (2006 21:165-183), Self-configurable robots are discussed, and an overview is given of many types of self-configurable robots. It shows that many configurations are possible.

'Emergent control of Self-Reconfigurable Robots", Kasper Stoy, Thesis of the Maersk Mc-Kinney Moller Institute for Production Technology, University of Southern Denmark Jan. 6, 2004, provides an overview of modular robots. According to the author, his thesis relates to a self-reconfigurable robot is a robot built from potentially many modules which are connected to form the robot. Each module has sensors, actuators, processing power, and means of communicating with connected modules. The robot autonomously changes shape by changing the way these modules are connected. The thesis further describes what it calls role-based control, which is a method used to implement locomotion gaits in chain-type self-reconfigurable robots, and a method to control the self-reconfiguration process. That method consists of two components. The first component takes a CAD model of a desired shape and generates cellular automata rules which take the global aspect out of the self-reconfiguration problem. The second component takes these rules and combines them with artificial chemical gradients to make a control system.

SUMMARY

Embodiments provide an element that allow a flexible use. In particular, the invention seeks to provide an element that allows making a construction composed of similar elements.

Embodiments provide an element comprising holding means, adapted for interacting with a functionally aligned holding means of a similar element, and comprising a holding state and a released state, said holding means in said holding state engaged with said aligned holding means of said similar element for holding said element positioned with respect to said similar element, and in said released state disengaged with said aligned holding means, and sensing means for providing grab-detection, said grab-detection including detection of one selected from an action leading to a grip of said element, having a grip on said element, an action of releasing a grip of said element, and a combination thereof, wherein said sensing means is functionally coupled to said holding means for upon said grab-detection actuating at least one of said functionally aligned holding means between said holding state and said released state.

Embodiments provide a system of elements that allow a flexible use. The elements can be used for manually building a construction. Making such a construction consistent and coherent can be easy. As will become clear below, the elements may comprise further features that may allow elements to displace under control, or even autonomously.

It was found that such a system with the elements allow flexible construction of an object. It may even be possible to design the elements within the current definition to group the elements into an object and to change the shape of an object autonomously.

In an embodiment, the holding means is actuated between said holding state and said released state when said grab-detection includes one of an action leading to a grip of said element, and an action of releasing a grip of said element.

In an embodiment, the sensing means are further adapted for determining a distance to a similar element. In particular, when sensing the distance to a neighbouring element, it allows improved actuation of holding means. It further allows functionally coupling with for instance a motion module (discussed below), for example to control speed, like approaching speed.

In an embodiment, the sensing means comprises sensors that are time-correlated for providing grab-detection. Time-correlation of the sensors allows improved grab detection. It for instance allows sensing if two faces are involved in the process of grabbing.

In an embodiment, the sensing means comprising a first and second sensor, functionally coupled with one another for providing said grab-detection.

In an embodiment, the element being three-dimensional and comprising: a centre point in said element; at least three faces coupled to said centre point; said holding means coupled to a first face of said at least three faces, adapted for interacting with said functionally aligned holding module of a facing face of a similar element, for in said holding state cooperating for holding said first face positioned with respect to said facing face, and in said released state not holding said first face positioned; said sensing means comprising a first and second sensor, with said first sensor coupled to a second face of said at least three faces; said second sensor coupled to a third face of said at least three faces, wherein said at least two sensors are functionally coupled with said holding means of said first face for upon said grab-detection actuating of said holding modules of said facing face between said holding state and said released state.

In an embodiment, the sensor means comprise optical sensors with spatial resolution, in particular cameras.

In an embodiment, the holding means comprise at least one holding module comprising two parts, adapted to exert a force to one another for holding faces positioned, and wherein said two parts are provided to faces comprising said holding module, allowing each face provided with said holding module to be held in position with respect to a facing face provided with said holding module, with the one holding module part of a face interacting with an other holding part of a facing face.

In an embodiment, the holding module comprises a holding state in which the holding module holds faces positioned, and a released state in which faces can move with respect to one another.

In an embodiment, the holding means comprises a holding module on each face, and said sensing means comprises a sensor on each face comprises a sensor, said sensors and said holding modules functionally coupled for upon said grab-detection actuating of said holding modules of said facing face between said holding state and said released state.

In an embodiment, the sensing means is adapted for alignment detection of said holding modules with holding modules of facing faces.

In this respect, grab-detection in its broadest sense relates to detection of actions leading to grabbing of an element, the actual holding of an element grabbed, and actions of releasing an element from a grip. Grabbing, in this respect, in its broadest sense relates to engaging an element with the intention of allowing changing the location and/or orientation of the element. This may be using a robot arm having a part that can engage the element and pick up the element. It may for instance preferably include picking an element up by a human hand, or changing the orientation by a human hand. Usually, this requires engaging two faces. Often, two opposite face are clamped between fingers of a hand. Often, the actions of grabbing take place within a limited timeframe. Often, the time between a hand approaching an element and actually engaging the element is in the order of minutes or less. In particular, this time is in the order of less than two minutes. The detection range can be less than 50 cm. Grab-detection in an embodiment may comprise transmitted human brain signals.

Various states of the elements can be defined in the following way.

An element can be either 'in-system' or 'out-system'. An element may be defined as being 'in-system' when it comprises a face that can interact with a facing face of another, similar element. For instance, an element can be in-system when it comprises a face that is both in physical contact with a face of at least one other, similar element, and properly aligned with a face of at least one other, similar element. An element that is defined as being 'out-system' does not have these requisites. A group of elements that are 'in-system' is designated or referred to as a system of elements. Multiple (separated) combinations of systems of elements may exist next to each other as does any combination of 'in-system' and 'out-system'. Proper alignment between 'in-system' elements is essential for allowing displacement or for holding a certain position.

When an element is 'in-system', then with respect to an adjacent face of another element, each face of the element can either be in a holding state or in a released state. In this respect, a holding state may be defined as a state that affects an element.

In a holding state, a face of an element cannot move with respect to an opposing or facing face of another, similar element. A holding state may be reached by means of one or more holding modules between opposing faces. A holding state may also be reached by means of other module(s), for example a motion module operating between two elements which has it's motion temporarily halted. A motion module may cooperate with a motion restriction module and/or a motion guiding module in order to achieve a holding state.

The holding state in general results from an activation of holding means. Such holding means may comprise a holding module. A holding means may also comprise a selection from a motion module, a motion restriction module, a motion guiding module. These modules may for instance in cooperation result in a locking state. The holding state of a face may thus be split up into a 'holding state by holding module' and a 'holding state by motion module lock'. An element may be in one or both of these states at a given time, and when either one or both of these states is active, the element is in a holding state. For example, when moving an element over faces of other, similar elements from one position to a destination position, the 'holding state by motion module lock' is activated when the destination position is reached. Then, a 'holding state by holding module' is activated before the 'holding state by motion module lock' is deactivated.

Furthermore, an element may be locked to another element and be in a holding state in various ways. An element may use its own holding module, it may be engaged by a holding module from that other element. The state of the holding module can thus either be: 'lock received', 'lock generated' or 'unlocked'. The above designation is of importance since a 'holding module' can be 'unisex', male or female, or 'hermaphrodite' when cooperating with other modules.

This may be of importance when an element is changing states, for example when going from a holding state to a released state and has a face lock module which has its lock received. Communication between elements may then be needed for that change to be possible.

A face can have multiple 'holding modules'. For example, when dividing a face into quadrants, each quadrant may have a holding module, for instance in its centre. Thus, when all the holding modules of a face are 'unlocked', that face may be in a 'released state' or in a 'holding state by motion module lock'. Two cooperating face lock modules of two opposing elements may only work together when their modules are in a certain physical alignment. This encompasses the two elements to be in alignment. A consequence of this may be that when a face is in a 'holding state by holding module' the element is in one of its proper alignments. The precursor or descendant of the 'holding state' is the 'released state'. It is clear that a transformation from a 'released state' into a 'holding state by holding module' can only occur when an element is properly aligned with another, similar element. In addition, two other states can be distinguished per holding module: 'in alignment for holding module operation' or 'out of alignment for a holding module operation'.

When an element is 'in-system', it means that there is a proper alignment for potential displacement by a motion module, for example. Element displacement and its topic of alignment which will be discussed later on.

An 'out-system' element has per definition no direct 'holding state' potential (no physical face-contact or no proper alignments) and has each face in a 'released state' or stated differently: the element is in a fully 'released state'.

An 'in-system' system of elements may have one or more 'set-holding states'. This means: each element belonging to a set of elements within that system, has one or more 'Holding states' active and this set cannot be split into subsets without breaking one or more of these 'Holding states'. When a 'Set-holding state' encompasses every element of that system, that system is also in a 'System-holding state'.

An element that is either 'in-system' or 'out-system' can be in a 'non-displacing state' or in a 'displacing state'.

When an 'out-system' element is in a 'displacing state', it means that outside system handling or forces are taking care of this displacing. For example, an element can be picked up by a human hand. Another example of such a combination of states is an element that is falling due to gravity forces.

When an 'in-system' element is in a 'displacing state', it can be an action of either 'direct displacing' or 'indirect displacing'.

'Direct displacing' of an element occurs when a face of that element is engaged with at least a motion module or a rotation module. That face is not in a 'holding state' but in a 'released state'.

'Indirect displacing' of an element occurs when that element is not engaged with a motion module or a rotation module. Furthermore, that element is part of a set of elements which are in a 'set-holding state'. In that 'set-holding state', at least one other element of that set can be in the 'displacing state' of 'direct displacing' (piggybacked analogy). Based upon the principles described here, various combinations are possible.

In an embodiment, an element is cubic and comprises six faces. From the perspective of the element, there are then six directions: North, South, East, West, Up and Down.

Embodiments further or additionally provide a system comprising at least a first, a second and a third element, which may be of the type defined above. This system further comprises a motion module, said elements being three-dimensional and each element comprising: a centre point in said element; at least one face coupled to said centre point and comprising: a motion-guiding module, defining a trajectory over at least part of said face; a motion-restriction module, adapted for limiting the displacement of said centre point with respect to said centre point of one of the other elements to at least one trajectory selected from the group consisting of said trajectory and said trajectory of said other element, when interacting with said motion module, wherein said motion module is adapted to be coupled to a face of one of said elements, and adapted for displacing said centre point of said one element with respect to said centre point of one of the other elements when interacting with the motion-guiding module of said one of the other elements, said motion-guiding module, said motion module and said motion-restriction module defining different module types, wherein for displacing said centre point of said first element away from said centre point of said second element and towards said centre point of said third element, a first face of said at least one face of said first element faces at least one of a second face of said at least one face of said second element and a third face of said at least one face of said third element, thus providing facing faces, and wherein for said displacing: said motion module interacts with at least one motion-guiding module, and with at least one motion-restriction module, with said facing faces providing said interacting modules while displacing; at least one module of said first face interacts with at least one module of at least one different module type of at least one other of said facing faces while displacing, and said at least one module of said first face interacts with at least one module of a different module type of said second face and at least one module of a different module type of said third face.

It was found that such a system with the elements allow flexible construction of an object. It may even be possible to design the elements within the current definition to group the elements into an object and to change the shape of an object autonomously. In an embodiment, at least one element can be provided with a building plan for the shape. In an alternative embodiment, the building plan can be distributed over elements, and by communicating and distributing control, the elements together may accomplish shifting the shape. A building plan may consist of a definition of the eventual shape of an object. It may alternatively comprise intermediate constellations of elements, or intermediate shapes to arrive to an end shape.

The motion module, motion restriction module and motion guiding module allow minimal displacement distances or orientation changes of elements, in particular of the centre points of elements, for changing shapes and constellations of elements. Thus, changes may take less time and/or less energy.

In this description, a configuration is used for an assembly of elements that are grouped together in a substantially consistent orientation with respect to one another. The elements in such a configuration may form an object. For such an object to change its shape, one or more elements move or displace with respect to other elements. This statement, however, does not work the other way around: Elements may have displaced, but that does not always mean that the shape of the object changed. If at least some of the elements of an object displace in a predefined manner, it is possible to in fact have displaced the entire object.

Faces of elements face other faces. In its broadest sense, faces are thus directed to one another. The facing faces may be opposite one another. In an embodiment, facing faces may at least partly overlap.

Faces may be curved. In an embodiment, faces are flat, planar. Thus, a face defines a plane over which in an embodiment a face of another element can slide. In such a state, faces are facing, and during said sliding opposite one another and partly overlapping.

The various modules and parts are 'coupled'. In particular, this relates to functionally coupled. In particular embodiments, this relates to parts or modules that are physically coupled. More in particular, in an embodiment it is used to cover connected. Specifically, in an embodiment parts, faces, modules and the like that are fixed or mounted. In this respect, fixed refers to for instance welding, gluing, and the like. Mounted may refer to the use of attachment provisions, like bolts and nuts.

'Interacting' relates to modules and/or elements that exert force to one another, but also to exchanging data, exchanging instruction program parts, and exchanging feedback. In an embodiment, interacting relates to modules and/or elements that are in contact. In an embodiment, interacting relates to modules and/or elements that are engaging.

Various modules are provided 'for displacing'. This relates functionally to the process of displacing an element. It can also include preparations for displacing elements. 'For displacement may also include post-processing. It may include, for instance, displacement of one or more motion modules over one or more faces of an element, or between elements, to their actual position on a face where they start displacing an element. It may for instance also include storing a motion module after use, or transmission of an end position to other elements. 'For displacing' may for instance also include the time during which data is exchanged in preparation for setting an element in motion.

'While displacing' refers to the time frame during which elements are actually in motion. For displacing elements, multiple instances of 'while displacing' may occur.

The faces are provided to allow a face to exert or transmit a force to another face.

A movement of an element can in fact be split into an actual displacement of a centre point of an element, and a change in orientation. A change of orientation is for instance a rotation about a line through the centre point: the centre point does not change its position. In this respect, the motion module of an element is instrumental for an actual displacement of a centre point of an element. An element may further comprise an orientation module for changing the orientation of an element. In an embodiment, the motion module and the orientation module may be combined.

An element may comprise parts defining an outer contour of an element. For instance, an element may comprise ribs. An element comprises a face. A face at least has supports allowing one element to rest on another element. Ribs for instance define such a face. The space between ribs may be open. Alternatively, support may be provided by exerting a force, for instance aerodynamic or electromagnetic forces. In an embodiment, each element further comprising a face provided with a surface at a surface-distance from said centre point. Such a surface provides a solid, physical support. A surface may be completely closed. Alternatively, a face may comprise a surface that has openings. For instance, the surface may be meshed. Often, such a face is planar, defining a bounded plane.

In a sense, the motion module in fact drives the movement of an element with respect to another element.

The motion-guiding module in a sense steers a direction of displacement of an element with respect to another element. In a case when one element is in contact with another element, the motion guiding module may comprise a track on one element and the other element follows that track.

One or more of the elements may further comprise a motion-restriction module adapted for limiting the displacement of said centre point with respect to said centre point of one of the other elements to at least one trajectory selected from the group consisting of said trajectory and said trajectory of said other element, when interacting with the motion module of the other element. The interaction between at least one of the motion module, the motion-guiding module and the motion-restriction module from the face of an element with at least one different module from an element with a facing face may in fact restrict the distance between those elements. It may hold these elements together or release these elements to allow them to move away from one another. It may also keep the distance between these elements between defined limits. In combination and/or in a separate action, the interaction may also keep orientation of these element with respect to one another elements limits. This function occurs while a motion module, a motion-restriction module and a motion-guiding module interact. This may also be the case when elements are not displacing any more. In such a case, modules may still be interacting. This may be referred to as a holding state.

The modules of the current system, in particular the elements, provide a reliable displacement of elements. The result of a displacement is at least partially predictable. Displacement follows at least part of a trajectory. Interaction between on or more motion modules, one or more motion guiding modules, and one or more motion restriction modules limit the displacement of a centre point with respect to one or more other centre points of other elements to at least one trajectory. Such a trajectory may be predefined. It may be a fixed route over a face. For instance a rail provides such a fixed route.

Embodiments further pertains to a system comprising at least a first, a second and a third three-dimensional element, each element comprising: a centre point in said element; a motion-guiding module, coupled to said centre point and defining a trajectory over said element; a motion module, adapted for displacing the centre point with respect to a second centre point of one of the other elements using the motion-guiding module of that other element; a motion-restriction module, adapted for limiting the displacement of said centre point with respect to said second centre point to at least one trajectory selected from the group consisting of said trajectory and a second trajectory of said other element, wherein said motion-guiding modules of at least two of said elements are functionally coupled for enabling said motion module to displace the centre point of a third displacing element which is in contact with one of the other two elements away from the centre point of one of the other two elements and towards the centre point and in contact with the other of the other two elements.

In an embodiment, said first face changes its interacting module for said displacing. In an embodiment, while displacing, said motion module is coupled to said first face.

In an embodiment, at least one module of said second face and at least one module of said third face interact with a different module of said first face while displacing.

In an embodiment, said modules of said second face and said third face interact one after the other.

In an embodiment, said modules of said second face and said third face interact one after the other with a different module of said first face for said displacing.

In an embodiment, said modules of said first, second and third face interact alternatingly while displacing.

In an embodiment, for said displacing, at least one of said modules from each of said first, second and third face interacts.

In an embodiment, each of said elements comprise a motion module. In particular, each of the elements comprises at least one motion module. This increases flexibility and speed.

In an embodiment, each of said at least one face of said elements comprises a motion module. This again increases speed and flexibility, allowing elements to work for instance autonomously, or in subgroups.

In an embodiment, each element comprises at least two of said faces. With proper orientation of faces of an element with respect to one another, for instance motion in two dimensions and eve three dimensions becomes easier to accomplish.

In an embodiment, said motion module is adapted for changing an orientation of said one element, coupled to said motion module, and an other element, having a face having a module interacting with said motion module, with respect to one another, in particular rotating said face coupled to said motion module and a face facing said face coupled to said motion module with respect to one another, more in particular rotating about an axis through said centre point of said one element.

In an embodiment, at least one of said elements further comprises an orientation module, adapted for changing an orientation of said one element and another of said elements with respect to one another, in particular rotating said face coupled to said orientation module and a face facing said face coupled to said orientation module with respect to one another, more in particular rotating about an axis through said centre point of said one element.

In an embodiment, said motion module is adapted for decoupling from said face.

In an embodiment, said motion module is displaceable when it is decoupled from said face.

In an embodiment, said motion module is displaceable to a neighbouring element when it is decoupled from said face.

In an embodiment, said one element comprises at least two faces, and said motion module is displaceable from one face to a next face of said one element.

In an embodiment, said motion module is displaceable inside said element from one face to another face of said one element when it is decoupled from said face.

In an embodiment, said motion module, said motion restriction module and said motion guiding module comprise a holding state in which at least partially overlapping facing faces are held in their mutual position, said holding state in particular involving at least a motion module from one face and a motion restriction module from a face facing said one face.

In an embodiment, each element comprises a holding module, coupled to a face, for interacting with a holding module of a facing face for holding said face positioned with respect to said facing face. The holding module holds at least one from position and orientation. In an embodiment, the holding module of an element may engage another element. In an embodiment, said holding module comprises two parts, adapted to exert a force to one another for holding elements positioned and/or in their orientation with respect to one another. In an embodiment, one element actuates its first holding module part to engage the second holding module part of another element. In this or another embodiment, the other element may in turn actuate its second holding module part to disengage from the first holding module part of the other element.

In an embodiment, said holding module comprises two parts, adapted to exert a force to one another for holding faces positioned.

In an embodiment, said holding module comprises two parts, adapted to exert a force to one another for holding faces positioned, and wherein said two parts are provided to faces comprising said holding module, allowing each face provided with said holding module to be held in position with respect to a facing face provided with said holding module, with the one holding module part of a face interacting with an other holding part of a facing face.

In an embodiment, said holding module comprises a holding state in which the holding module holds faces positioned, and a released state in which faces can move with respect to one another.

In an embodiment, said at least one face of said each element is connected to said element.

In an embodiment, said motion module is connected to said face.

In an embodiment, the system further comprises a fourth such element comprising at least the features of the first, second and third elements, and providing a fourth of said at least one face to said system.

In an embodiment, for said displacing, said fourth face faces said first face.

In an embodiment, during said displacing said first element displaces in a first direction, and wherein a further, subsequent, displacing comprises:
at least one module of said first face interacts with at least one module of at least one different module type of said fourth face while further displacing in a further direction different from said first direction, in particular at an angle to said first direction.

In an embodiment, said first element further comprises a further at least one of said faces, providing a fifth face to said system. For displacing said fifth face may face said fourth face.

In an embodiment, during said displacing said first element displaces in a first direction, and wherein a further, subsequent, displacing comprises:
said fifth face facing said fourth face, and
at least one module of said fifth face interacts with at least one module of at least one different module type of said fourth faces while further displacing in a further direction different from said first direction during said displacing.

In an embodiment, the motion-guiding module of at least one of said elements is adapted for providing said trajectory functionally around said element.

In an embodiment, said motion-guiding module of said at least one element is adapted for defining a further, second trajectory crossing said predefined, first trajectory. This allows in operation displacement of one of the other elements in two dimensions.

In an embodiment, said elements comprising at least two of said faces, provided with a surface at a surface-distance from said centre point.

In an embodiment, at least part of said motion module is adapted for displacing internally inside said element.

In an embodiment, at least part of said motion module is adapted for changing its orientation inside said element.

In an embodiment, said elements comprise at least two of said faces, said elements neighbouring one another and said motion-guiding modules of said faces connected to one another.

In an embodiment, said faces comprise boundaries, with said motion-guiding modules running to at least one of said boundaries.

In an embodiment, said motion-guiding module comprises a trail of detectable indications, in particular a trail of electromagnetic radiation, like light, a magnetic trail, an electrostatic trail, sound or ultrasound trail. When provided with one or more sensors, the trail can be followed.

In an embodiment, said trajectory comprises a physical track.

In an embodiment, said trajectory comprises a rail. An example of this is for instance a type of rails that a train uses.

In an embodiment, said trajectory at least partly follows a straight line.

In an embodiment, said element comprises at least one face comprising a surface provided with said motion-guiding module.

In an embodiment, said motion-guiding module comprises at least two motion-guiding parts defining a plane.

In an embodiment, two motion-guiding parts have at least one crossing, in particular said motion-guiding parts are straight and cross one another rectangularly.

In an embodiment, said element comprises at least one face comprising a surface provided with said motion module, in particular said surface is a flat plane forming a face of said element.

In an embodiment, said element comprises at least one face comprising a surface provided with said motion module and said motion-guiding module.

In an embodiment, said element comprises a series of faces each having a surface, in particular said faces defining said element.

In an embodiment, said element comprises a series of at least two of said faces, in particular said element comprises a series of coupled faces forming faces of said element.

In an embodiment, said element comprises at least 4 faces, in particular at least 6 faces, more in particular opposite and having a normal direction orthogonal normal.

In an embodiment, said element is a regular body.

In an embodiment, said element is substantially a block, more in particular a cube. An advantage of cubes is that they allow easy stacking In an embodiment, said motion-restriction module comprises a first motion-restriction module part, arranged for physically engaging an other element, and restricting motion in a first direction having a component perpendicular to said trajectory.

In an embodiment, said motion-restriction module comprises a second motion-restriction module part, arranged for physically engaging an other element and restricting motion in a second direction having a component perpendicular to said trajectory and perpendicular to said first direction.

Embodiments further pertains to an element comprising: at least one face comprising an exterior surface for providing abutment for a face of another, similar element; at least one holding module for holding said element with respect to at least one other, similar element, said holding selected from holding position and holding orientation; at least one motion module for moving said element with respect to at least one other, similar element substantially along or on an exterior surface of at least one other, similar element, said moving selected from displacing of a centre of mass with respect to one another, displacing a geometrical centre with respect to one another, and changing an orientation with respect to one another; a communication module for exchanging data with at least one other, similar element, said data comprising at least one position status; a data processing module, functionally coupled to said communication module for processing data from said communication module; an energy module functionally coupled for providing energy to at least said displacement module, said communication module, and said data processing module, wherein said data processing module comprises software which, when running on said data processing module, comprises the steps of: retrieving a set position, selected from place and orientation and a combination thereof, for said element via said data communication module; retrieving current position information; producing at least one motion instruction for said motion module for moving said element from said current position to said set position by moving its exterior surface over or along said exterior surface of said at last one other, similar element; and providing said motion module with said at least one motion instruction.

In this respect, producing a motion instruction may comprise calculating a motion instruction, or it may comprise calculating intermediate steps. Thus, it may comprise calculating at least one motion instruction for moving said element towards said set position.

In an embodiment, in operation said element is in physical contact with at least one other, similar element with its exterior surface at least partly in contact with at least part of an exterior surface of said at least one other, similar element.

In an embodiment, elements comprise at least one exterior surface and when displacing, the surface displaces substantially parallel to an abutting exterior surface of another, similar element. In an embodiment, the surfaces slide with respect to one another, with for instance an air cushion between the surfaces, or with a small distance for instance using magnetic levitation. An element can thus 'hover' over another element.

An element can be characterised by its position and orientation. Both position and orientation may be absolute and relative. The relative position can be defined as a position of an element with respect to one or more other elements. Relative position may also be defined as the position of an element in an object it forms together with other elements, or the position in a group of elements. In an embodiment, elements may be provided with a position sensing part functionally coupled to said data processing module. The sensing part may be part of the sensing means discussed earlier.

In an embodiment said position sensing part comprises a relative position sensing part for sensing the position of said element with respect to at least one other, similar element. Such an element may be in contact with said element.

In an embodiment said position sensing part comprises a local absolute position sensing part for sensing the local position of said element with respect to a location within a group of elements.

In an embodiment said position sensing part comprises an absolute position sensing part for sensing the global position of said element.

In an embodiment an element comprises an orientation-sensing part functionally coupled to data processing module.

In an embodiment, said orientation-sensing part comprising a relative orientation sensing part for sensing the orientation of said element with respect to at least one other, similar element which is in contact with said element.

In an embodiment said orientation-sensing part is adapted for sensing the orientation of said element with respect to a force field, for instance a gravitational force field, an electrostatic force field, a magnetic force field.

In an embodiment said motion module comprises a rail with displacer. In order to actually displace an element with respect to another element, a displacer of one element runs in or on a rail of another element. The displacer may physically engage the rail. Alternatively, it may exert one or more forces to the rail, even without being in physical contact with the rail, like for instance exerting magnetic forces.

In an embodiment said rails runs in at least two dimensions, in particular on/in exterior surface.

In an embodiment, elements may comprise a shared displacer.

In an embodiment said motion module comprises at least one piezo element ("stepper").

In an embodiment said element comprises walls defining the outer boundaries of an element.

In an embodiment, at least one exterior wall may be provided with a seal for sealing space between surfaces of elements. Thus it is possible, using elements, to build a leak-tight, or even an air-tight construction.

In an embodiment said seal has an engaging position and disengaging position.

In an embodiment said seal is circumferential or peripheral with respect to a wall of an element. The seal may comprise parts that run along sides of a wall.

In an embodiment, at least one wall comprising a planar surface part.

In an embodiment, an element comprises at least one functional surface, for instance comprising a photovoltaic element. Alternatively or in combination, a functional surface is provided with one or more display elements. A display element may comprise one or more pixels that may form a display. In an embodiment, the neighbouring surfaces of several elements may form a display. Thus, the elements allow presentation of visual information. Furthermore or alternatively, the functional surface may comprise touch-functionality and/or proximity-sensing, allowing formation of for instance a touch panel. In an embodiment, elements can be combined to form a display for playing movies, television, or games. In case of elements which have sides smaller than 1 cm, the elements will in many instances combine the functional surfaces into one display of combined element-functional surfaces.

In an embodiment, said element comprises a container space in said element, in particular a closable container space.

In an embodiment said container space comprises a closure or an actuator for closing said container. In an embodiment said actuator is functionally coupled to said data processing module.

In an embodiment, said element comprises at least one actuator for selectably operating said motion module, in an embodiment for retracting said motion module within said element. In an embodiment said actuator is functionally coupled to said data processing module.

In an embodiment, said data processing module may comprise any one selected from: a memory, a master-slave setting, a dynamic master slave setting, a building plan, time-based position instructions, a time keeping part.

In an embodiment, the size of the elements is 10 cm down to 0.1 micron, in particular 1 cm down to 0.5 micron, more in particular 1 mm down to 0.5 micron, specifically 100 micron down to 0.1 micron.

Embodiments further pertains to a method for conveying material, comprising providing said material in at least one element described above.

Embodiments further pertains to an element comprising: at least one exterior surface, for instance a wall, allowing displacement; at least one holding module, for maintaining a position of said element with respect to or onto a similar element; at least one motion module for displacing said element with respect to other, similar elements substantially over said exterior surface; the motion module can also be a separate part shared with at least one other element, see rail for example, or it can induce linear displacement, rotation, displacing of centre of mass with respect to one another, change of orientation with respect to one another; changing distance of said element with respect to other, similar elements; Furthermore, a telescope part may be provided on the element.

The element may further comprise: a communication module for exchanging data with other, similar elements; in particular, said data comprising orientation, position with respect to others, fixation, external physical parameters like temperature, sensor data, time, or software or firmware updates, said communication module may be adapted for wireless transmission of data.

The element may further comprise: a data processing module.

The element may further comprise: an energy module, for instance for providing energy to said motion module, motion-restriction module, to said communication module, to said data processing module, for instance providing said energy using electromagnetic radiation, wireless transfer, energy from other, similar element, the energy module may also provide storage or energy.

In this respect, 'similar' refers to elements comprising at least one face provided with a holding module and a motion module that allows cooperation.

In an embodiment, the elements are functionally in physical contact with one another. In particular, at least parts of their walls or external surfaces are in physical contact with one another. In particular, an area of contact is defined.

Forces pressing one construction element onto another can be taken up via a motion module, a holding module, and/or at least part of said exterior surface.

Elements may be combined in an object, where their position may be defined with respect to the object or with respect to other elements. In this respect, the neighbourhood may be of importance. In an embodiment, the neighbourhood is defined as one beyond said element. In an embodiment, the neighbourhood may be two elements beyond said element.

In an embodiment, an element is at least partly produced using for instance 3D printing. In an embodiment, plant cells may be used for producing a "wood" surface. Such plant cells may be attached to a carrier substrate.

In an embodiment, elements in an assembly of elements work together, wherein said elements have a master/slave setting, in particular a dynamic master/slave setting.

Embodiments further pertain to a game assembly, comprising a system described above, and a computing device in communication with at least one of said elements, said computing device running a computer program which, when operating on said computing device, performs the steps of: requesting a user input for defining a start configuration of said elements; requesting a user input for defining an end configuration of said elements; communicating said start configuration and said end configuration to at least one of said elements.

Embodiments further pertain to a computer implemented construction tool, comprising a computer program which, when running on a computer device, performs the steps of: defining in a memory a set of at least three elements, each element comprising: a centre point in said element, a relative position and an orientation; a motion-guiding function, coupled to said centre point and defining a trajectory over said element; a motion function defining displacing the centre point with respect to a second centre point of one of the other elements using the motion-guiding function of that other element; a motion-restriction function, adapted for limiting the displacement of said centre point with respect to the second centre point to at least one trajectory selected from the group consisting of said trajectory and a second predefined trajectory of said other element, wherein said motion-guiding function of at least two of said elements define a functionally coupling between elements for enabling said motion function to displace the centre point of a third, displacing element which is in contact with one of the other two elements away from the centre point of one of the other two elements and towards the centre point and in contact with the other of the other two elements.

In this respect, the construction tool may also be seen as a game, a game, or a simulation, in which features of functional elements are modified and effects of modification may be explored. Other functions may for instance be: sensing other elements; defining in a memory a start configuration of said elements; defining in a memory an end configuration of said elements.

Embodiments further pertains to a method for playing a game, comprising providing a computer program which, when running on a computer device, performs: defining a set of at least three three-dimensional elements in a memory, each element having a centre point and at least one face; defining in a memory a start state of said set of elements, by a start outer boundary of said set of elements, and a at least a position of each element with respect to said outer boundary; defining in a memory an goal state of said set of elements, which goal state is different from said start state and requiring displacement of at least one element; providing a function toolbox comprising: a set of motion-guiding functions, said motion-guiding functions coupled to said centre point and defining a trajectory over said element; a set of motion functions defining displacing the centre point with respect to a second centre point of one of the other elements using the motion-guiding function of that other element; a set of motion-restriction functions, adapted for limiting the displacement of said centre point with respect to said second centre point to at least one trajectory selected from the group consisting of said trajectory and a second trajectory of said other element; a set of sensor functions providing information on the environment of an element; presenting said function toolbox to a user and enabling said user to select at least one function from said function toolbox for each element; providing for each element an element computer program operationally coupling said selected functions, and which element computer program when executed collects sensor input, relative position input, and allows motion; running on each element said element computer program.

Again, a game may also be or comprise a simulation as explained above.

In particular, the method comprises providing input regarding the presence of another element in contact with at least one face.

In an embodiment, said method further comprises defining in a memory a goal state of said set of elements by an end outer boundary of said set of elements.

In an embodiment, said method further comprises defining in a memory a goal state of said set of elements by defining for at least one element a requirement with respect to said set of elements.

In an embodiment, said method further comprises defining in a memory a goal state of said set of elements by defining for at least one element a requirement with respect to at least one element of said set of elements.

In an embodiment, said method further comprises defining in a memory a goal state of said set of elements by defining for at least one element a requirement with respect to at least one specific element of said set of elements.

The behaviour of an element in an embodiment has a factor of randomness. For instance a selection of a direction of motion may comprise a factor of randomness. In an embodiment, the motion of an element may be based upon a genetic algorithm. In an example, a random generator influences the selection of for instance the direction of motion. In case such a random selection has a good effect, for instance it brings an element closer to a final goal, a value of a weight factor associated with the direction is increased. If the random selection has a bad effect, the value of the weight factor is decreased.

In a broader sense, the behaviour of an element may at least partly be controlled, or problems that an element or an assembly or system of elements face may be solved, using an evolutionary algorithm. An element in this embodiment comprises a controller comprising machine instructions using an evolutionary algorithm. An evolutionary algorithm generates solutions to optimization problems using techniques inspired by natural evolution. A genetic algorithm in fact is a type of an evolutionary algorithm. Further examples of evolutionary algorithms are inheritance, mutation, selection, and crossover. An evolutionary algorithm uses for instance mechanisms inspired by biological evolution, such as reproduction, mutation, recombination, and selection. Many of these algorithms and mechanisms have a factor of randomness or chance: A property or a choice that needs to be made can at least partly be based upon a random selection. In this way, solutions and operational modes may be found that provide a better solution to a problem.

Due to changes in the environment of elements and/or a vast amount of options, an exact solution or even an optimal solution, and/or for instance a statistical probability that a solution may reach an end goal, may not always be calculated within an available time frame. When for instance one element changes its position, a calculation at/of another element may become invalid.

Similar techniques, similar to evolutionary algorithms, differ in the implementation details and the nature of the particular applied problem. As such, these techniques are known in the art of computer software development. An element, at least part of the elements, or an assembly of elements may use the following algorithms or combinations thereof:

Genetic algorithm: Elements may use it for solving a problem, for instance in the form of strings of numbers (traditionally binary, although the best representations are usually those that reflect something about the problem being solved), by applying operators such as recombination and mutation (sometimes one, sometimes both).

Genetic programming: Elements may use it for making their control instructions more flexible. Effectiveness of for instance parts of computer programs in solving a problem is evaluated, and their fitness is determined by their ability to solve a (computational) problem.

Evolutionary programming: Usually, the structure of a computer program is fixed and its numerical parameters are allowed to evolve.

Gene expression programming: —Like genetic programming, GEP also evolves computer programs but it explores a genotype-phenotype system, where computer programs of different sizes are encoded in linear chromosomes of fixed length.

Evolution strategy—Works with vectors of real numbers as representations of solutions, and typically uses self-adaptive mutation rates.

Memetic algorithm—It is the hybrid form of population based methods. Inspired by the both Darwinian principles of natural evolution and Dawkins' notion of a meme and viewed as a form of population-based algorithm coupled with individual learning procedures capable of performing local refinements.

Differential evolution—Based on vector differences. Elements may use it for solving numerical optimization problems.

Neuro-evolution—Similar to genetic programming but the genomes represent artificial neural networks by describing structure and connection weights. The genome encoding can be direct or indirect.

Learning classifier system is a machine learning system with close links to reinforcement learning and genetic algorithms. It for instance comprises a population of binary rules on which a genetic algorithm altered and selected the best rules. Rule fitness may be based on a reinforcement learning technique.

The elements or assembly of element may also use so called Swarm algorithms, including:

Ant colony optimization—Based on the ideas of ant foraging by pheromone communication to form paths. Elements may use this when confronted with combinatorial optimization and graph problems.

Bees algorithm is based on the foraging behaviour of honey bees. When elements face problems like routing and scheduling.

Cuckoo search is inspired by the brooding parasitism of the cuckoo species. It also uses Levy flights. Elements may use the algorithm global optimization problems.

Particle swarm optimization—Based on the ideas of animal flocking behaviour. Elements may use this algorithm for numerical optimization problems.

Other population-based meta-heuristic methods comprise:

'Firefly algorithm', inspired by the behaviour of fireflies, attracting each other by flashing light. This is especially useful for multimodal optimization.

Harmony search—Based on the ideas of musicians' behaviour in searching for better harmonies. This algorithm is suitable for combinatorial optimization as well as parameter optimization.

Gaussian adaptation—Based on information theory. Used for maximization of manufacturing yield, mean fitness or average information. See for instance Entropy in thermodynamics and information theory.

It was found that a deterministic set of instructions defining for an element its actions does not always work: Sometimes, due to changes of and in the environment and the number of options that are possible, a 'best solution' of actions to achieve a goal does not exist, or may take too long to calculate. For instance, calculations in one element may become invalid when another element changes its position or orientation. Alternatively, one or more subsets of actions may be defined to accomplish intermediate goals.

Embodiments further pertains to a system comprising at least a first, a second and a third three-dimensional element, each element comprising: a centre point in said element; a motion-guiding module, coupled to said centre point and defining a trajectory over said element; a motion-restriction module, adapted for limiting the displacement of said centre point with respect to the second centre point to at least one trajectory selected from the group consisting of said trajectory and a second trajectory of said other element; said system further comprising a motion module, adapted for displacing the centre point of an element with respect to a second centre point of one of the other elements, said motion module adapted for engaging the motion-guiding module of at least one of the element, wherein said motion-guiding modules of at least two of said elements are functionally coupled for enabling said motion module to displace the centre point of a third, displacing element which is in contact with one of the other two elements away from the centre point of one of the other two elements and towards the centre point and in contact with the other of the other two elements.

In an embodiment, said motion module, also referred to as a shared motion module, can move along an element from one face to another. At a face, or a position on a face, the shared motion module can functionally perform its function of motion module. When moving along an element from one face to another, the centre point of an element may remain at rest. In an embodiment, the shared motion module can even travel from one element to a next element, in particular a neighbouring element.

The shared motion module in an embodiment engages the motion guiding module. It thus uses provisions in or on an element that are already present. If, for instance, the elements are provided with tracks, motion guiding module engagement parts of the shared motion module may engage the motion guiding module. Such a motion guiding module may for instance be provided below the surface of a face of the element, like for instance a flush-mounted track. This allows a shared motion module to displace below the surface of a face of an element.

In order to be able to displace one element with respect to at least one other element, the shared motion module may comprise a releasable attachment part for attaching the shared motion module to an element. Releasing the attachment part allows the shared motion module to displace with respect to an element, and activating the attachment part keeps the shared motion module attached to an element. The attachment part of the shared motion module may engage an element, for instance by exerting a force, like a magnetic force. Alternatively, the attachment part may physically engage the element. A mechanical attachment part can cooperate with cooperating attachment parts provided in the element. For instance, the shared motion module may comprise an anchoring pin locking into an anchoring hole in an element, or vice-versa, the shared motion module can be provided with the anchoring hole.

In order to be able to displace an element, the shared motion module may comprise an element displacement part. Such an element displacement part engages a motion guiding module on an other element. Often, the other element is an element which is in face contact with an element that (temporarily) houses the shared motion module. The element displacement part exerts a displacing force on a motion guiding module of another element. This can be a mechanical force, for instance from a wheel running in a track, a gear wheel running on a rack rail, or piezoelectric elements exerting force. Alternatively, for instance a magnetic force may be exerted. Often, the element displacement part extends from a face of an element that is engaged by the shared motion module.

In order to displace along an element, or even move from one element to another, the shared motion module comprises a motion module movement part. This motion module movement part may engage the motion guiding module of the element over of in which the shared motion module is displacing. In an embodiment, the motion module movement part is the element displacement part that is withdrawn to work on the element that employs the shared motion module, or on or within the shared motion module travels. For instance, one or more wheels may extend from the shared motion module in a direction facing away from the element, thus enabling engagement of a neighbouring element. These wheels may be retracted to extend from the shared motion module at an opposite end, allowing engagement of the element using the shared motion module.

An element may comprise one or more storage provisions for storing a shared motion module.

A shared motion module may comprise one or more of the functional parts of an element that are mentioned in this description. A shared motion module may also comprise at least part of one or more of the functional parts of an element that are mentioned in this description. For instance, a shared motion module may comprise one or more selected form the group consisting of a data processing device, data storage, an energy storage device, energy generating device, a data communication device, and a combination thereof. These devices and or functionalities are already described in relation to an element. This may even allow relatively simple elements only having passive functional parts and shared motion modules having active parts for engaging an element. In an embodiment, an element may comprise at least one motion module that can displace from a functional position at one face to a functional position at another face of an element, Thus, an element may be provided with one or more motion modules, reducing complexity of an element. This no longer requires at least one motion module for each face of an element.

In the current document, reference is made to three-dimensional objects or 3D objects. The elements are three-dimensional. Thus, simply placing elements together on a plane surface already makes an object three-dimensional. A three-dimensional object according to the current description, however, refers to an object that is composed of coupled elements and extending at least two elements in each dimensional direction. Such a three-dimensional object or 3D object would have at least 4 elements. In fact, three elements might already form a 3D object when one or more elements are out-of-plane with respect to the other elements.

In general, elements may comprise one or more faces that may be defined as being "polar". Suppose that one type of face may be defined as having the property "plus" and another type of face may have the property "minus" with respect to at least one of the motion module, motion restriction module, motion guiding module. Now suppose that a plus face can only couple to and displace over a minus face. When using elements like that, in general ordering of elements with respect to one another becomes important when composing or building an object out of elements. In general formulation, an element comprises at least one face that comprises at least one mirror symmetry with respect to at least one face of another element in view of at least one selected from the motion module, motion guiding module and motion restriction module when facing that other face. These symmetries may be referred to as inter-face symmetry. In an embodiment, the at least one face comprises at least one mirror symmetry with respect to the at least one other face with respect to its shape. Thus, two elements have at least one orientation with respect to one another in which they have a respective face and in which these faces fit on one another, can attach to one another, and move or displace over each others surface. In order to provide flexibility to build an object from elements, in an embodiment an element comprises at least two non-polar faces. In an embodiment, an element comprises less than four polar faces. More in particular, an element comprises less than three polar faces. Specifically, the polar faces are not provided on opposite sides of an element.

On the other hand, elements may comprise one or more faces that have mirror symmetry regarding motion modules, motion restriction modules and/or motion guiding modules in one or more mirror planes normal to the face or faces. Thus, an degree of intra-face symmetry may be provided. When using such elements, for elements to couple such faces or to displace over such faces only requires proper rotational orientation with respect to a rotational axis normal to those faces. When there is mirror symmetry in two perpendicular mirror planes, then coupling becomes even easier. When the respective faces are for instance square and these two mirror planes run through the centre of the square, then two square faces always couple exactly on top of one another. Thus, an increasing symmetry of a face with respect to its motion module and/or its motion restriction module and/or its motion guiding module reduces the need to check rotational orientation of elements with respect to one another. This again increases flexibility when building an object from elements.

In an embodiment, at least one face of an element has mirror symmetry in a mirror plane normal to the face and through the centre of the face. In particular, the face has mirror symmetry in two mirror planes that are normal to one another and the face. In an embodiment, the symmetry of the shape of the face and the symmetry of at least one of the motion module, the motion-guiding module and the motion restriction module coincide.

Embodiments further pertains to a game comprising shape-shifting an object of elements from a first shape to a second shape, wherein the position of at least one element with respect to at least one other of said elements changes during said shape-shifting.

The elements can in fact form construction elements for assembling a physical structure, for instance a building, a home, or the like. To that end, one or more symmetries of the shape of an element simplifies construction of an object of elements.

The most familiar type of symmetry is geometrical symmetry. A geometric object is said to be symmetric if, after it has been geometrically transformed, it retains some property of the original object.

The most common group of transforms is the Euclidean group of isometric, or distance-preserving transformations, in two-dimensional (plane geometry) or three-dimensional (solid geometry) Euclidean space. These isometries consist of reflections, rotations, translations and combinations of these basic operations. Under an isometric transformation, a geometric object is symmetric if the transformed object is congruent to the original. For the elements to easily produce an object, in an embodiment the elements are symmetric under at least one isometric transformation.

In an embodiment, the elements have a shape to allow tessellation in at least two dimensions. More formally, a tessellation or tiling is a partition of the Euclidean plane into a countable number of closed sets called tiles, such that the tiles intersect only on their boundaries. These tiles may be polygons or any other shapes. Many tessellations are formed from a finite number of prototiles; all tiles in the tessellation are congruent to one of the given prototiles. If a geometric shape can be used as a prototile to create a tessellation, the shape is said to tessellate or to tile the plane, or, using elements, a space. Certain polyhedra can be stacked in a regular crystal pattern to fill (or tile) three-dimensional space, including the cube (the only regular polyhedron to do so); the rhombic dodecahedron; and the truncated octahedron.

To make stacking and formation of a three-dimensional object possible without the need to control orientation of an element, the elements have an identical shape, and have a shape that allows filling a space. In two dimensions, tiling refers to filling a plane with identical Figures or a set of Figures. In the current discussion, elements are three-dimensional and in an embodiment have a shape allowing substantially seamlessly filling a space. This is also referred to as tessellation. In a simple example, identical cubes easily fill a space. In general, for instance polyhedra can be provided that allow filling a space. As such, in mathematics, such shapes are known. A space-filling polyhedron, sometimes called a plesiohedron (Grünbaum and Shephard 1980), is a polyhedron which can be used to generate a tessellation of space. Tessellations in three dimensions are also referred to as honeycombs.

Some literature states that the cube is the only Platonic solid possessing this property (e.g., Gardner 1984, pp. 183-184). There are, however, other identical shapes that allow tessellation. One can simply prove this by cutting a cube in regular pieces. On the other hand or additionally, a combination of tetrahedra and octahedra do fill space (Steinhaus 1999, p. 210; Wells 1991, p. 232). In addition, octahedra, truncated octahedron, and cubes, combined in the ratio 1:1:3, can also fill space (Wells 1991, p. 235). In 1914, Föppl discovered a space-filling compound of tetrahedra and truncated tetrahedra (Wells 1991, p. 234).

There seem to be only five space-filling convex polyhedra with regular faces: the triangular prism, hexagonal prism, cube, truncated octahedron (Steinhaus 1999, pp. 185-190; Wells 1991, pp. 233-234), and gyrobifastigium (Johnson 2000). The rhombic dodecahedron (Steinhaus 1999, pp. 185-190; Wells 1991, pp. 233-234) and elongated dodecahedron, and squashed dodecahedron appearing in sphere packing are also space-fillers (Steinhaus 1999, pp. 203-207), as is any non-self-intersecting quadrilateral prism. The cube, hexagonal prism, rhombic dodecahedron, elongated dodecahedron, and truncated octahedron are all "primary" parallelohedra (Coxeter 1973, p. 29).

In the period 1974-1980, Michael Goldberg attempted to exhaustively catalog space-filling polyhedra. According to Goldberg, there are 27 distinct space-filling hexahedra, covering all of the 7 hexahedra except the pentagonal pyramid. Of the 34 heptahedra, 16 are space-fillers, which can fill space in at least 56 distinct ways. Octahedra can fill space in at least 49 different ways. In pre-1980 papers, there are forty 11-hedra, sixteen dodecahedra, four 13-hedra, eight 14-hedra, no 15-hedra, one 16-hedron originally discovered by Foppl (Grünbaum and Shephard 1980; Wells 1991, p. 234), two 17-hedra, one 18-hedron, six icosahedra, two 21-hedra, five 22-hedra, two 23-hedra, one 24-hedron, and a believed maximal 26-hedron. In 1980, P. Engel (Wells 1991, pp. 234-235) then found a total of 172 more space-fillers of 17 to 38 faces, and more space-fillers have been found subsequently. P. Schmitt discovered a nonconvex aperiodic polyhedral space-filler around 1990, and a convex polyhedron known as the Schmitt-Conway biprism which fills space only aperiodically was found by J. H. Conway in 1993 (Eppstein). Thus, mathematical tessellation is complex. In the current invention, in an embodiment substantial tessellation may already be sufficient. In an embodiment, elements may be provided with sealing provisions that enable filling of remaining spaces between elements.

Elements may be combined into an object by placing elements on top of one another. Elements may also or additionally be held together by allowing at least some of the elements in an object to exert an attracting onto other elements in the object. When combining elements into an object, the elements may be placed substantially on top of one another. Thus, elements may align in three dimensions.

Alternatively, for instance for providing more cohesion, the elements may be combined in a bond. For instance, in two dimensions (in fact, one dimensional), in stretching bond, or another known bond. These bonds are in general known to a skilled person. These bonds can also be generalised in three dimensions. Thus, faces can overlap partially in one direction. In the other two directions, elements align. Bonds can also be designed in two directions. Thus, planes of elements are created. Bonds can even be designed in three directions, creating a three-dimensional bond. Faces may, for instance, overlap with only corner parts.

In elements of the current invention, in an embodiment the elements all have the same shape allowing them to substantially fill a space. Gaps may remain. In such instances, elements may be provided with gap-sealing provisions. In an embodiment, to allow elements to displace with respect to one anther without help from additional elements, the elements comprise motion modules guiding modules and motion restriction modules on each face.

The above-explained inter-face symmetry and the intra-face symmetry may be combined. Furthermore, these face symmetries may be combined with the shapes mentions above. Thus, face symmetry and shape symmetry may provide an additional flexibility in controlling, displacing, and building objects.

In an embodiment, the motion module, motion guiding module and motion restriction module are designed in such a way that that an element that has two opposite neighbours to move with respect to those neighbours in a direction away from those neighbours while these neighbours maintain their position. In particular, this is the case when the element was at first coupled to its neighbours. Before moving away or displacing, the element detached from the neighbouring elements. More in particular, an element is designed in such a way that it is surrounded by at least four neighbouring elements surrounding the element and at first coupled to the element, to move in a direction away from the neighbouring elements. This is easiest explained based on elements that are block-shaped and have the same size.

Suppose the 9 block-shaped elements form a block object of 3×3 elements. The elements are in face-contact and motion restriction modules couple respective elements of the 9 elements together in such a way that they form one object in the shape of a block. Then there is one centre element that has 4 elements that are in face-contact with the centre element, and there are four 'corner elements'. If the centre element wants or needs to move out of the 3×3 block while the other elements remain coupled and in position, the centre element needs to displace in a direction that is perpendicular to a plane of the object. In such a situation, for instance motion restriction modules of relevant elements may be actuated in such a way that the centre element is no longer coupled to the other elements. Now, motion modules can be actuated to set the centre element in motion.

The elements are for instance symmetrical, for instance having three orthogonal mirror planes. When the elements are block-shaped, easy stacking is possible.

The person skilled in the art will understand the term "substantially" in this application, such as in "substantially encloses" or in "substantially extends up to". The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The construction elements herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. Embodiments may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

Additional features described may allow increasing complexity of the system, or may allow elements to function more or less autonomous. Elements may group together to perform tasks, possible by features that all the elements have, or using one or more features that only one or part of the elements have.

Embodiments further applies to construction element or parts thereof comprising one or more of the characterising features described in the description and/or shown in the attached drawings. Embodiments further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

DRAWINGS

Embodiments will now be described, by way of example only, with reference to the accompanying schematic drawings (which are not necessarily drawn to scale) in which corresponding reference symbols indicate corresponding parts, showing an embodiment of a construction element, and showing in:

Figure 5A:
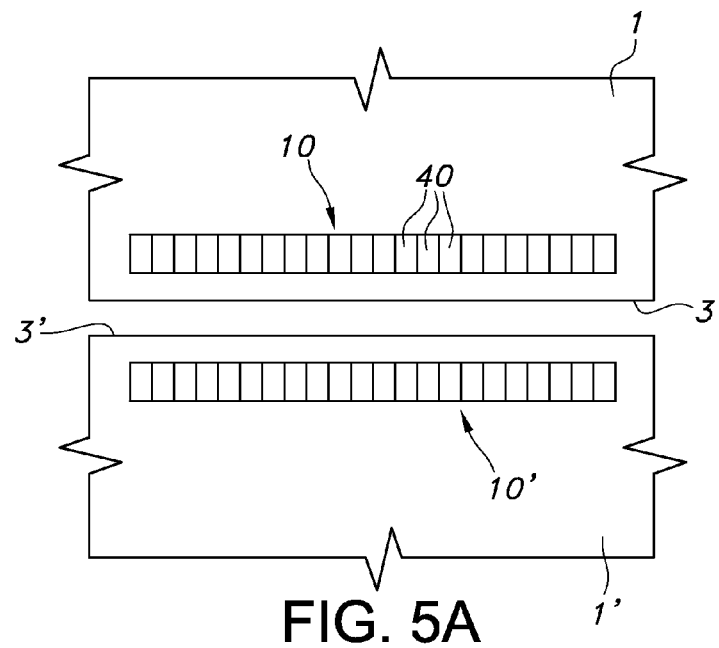
Figure 5B:
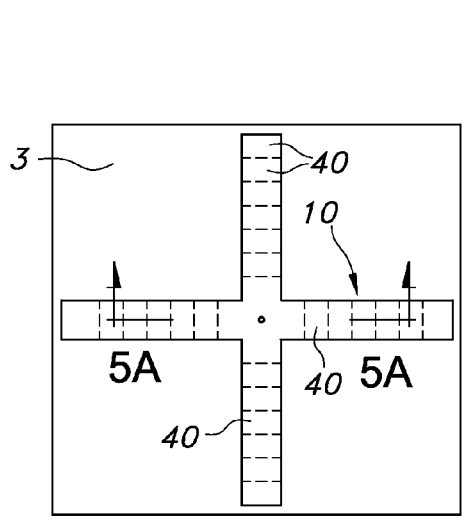
Figure 5C:
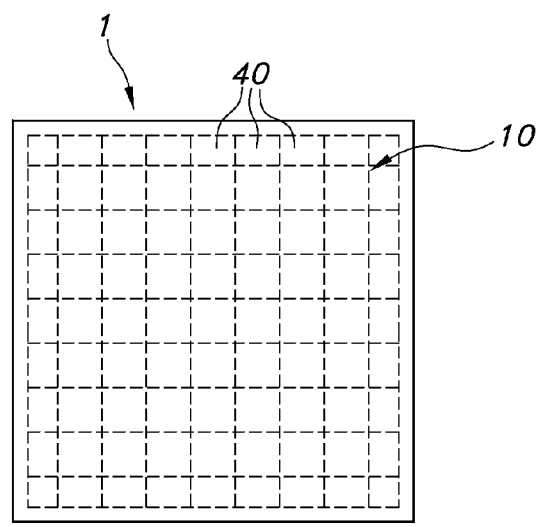
Figure 8:
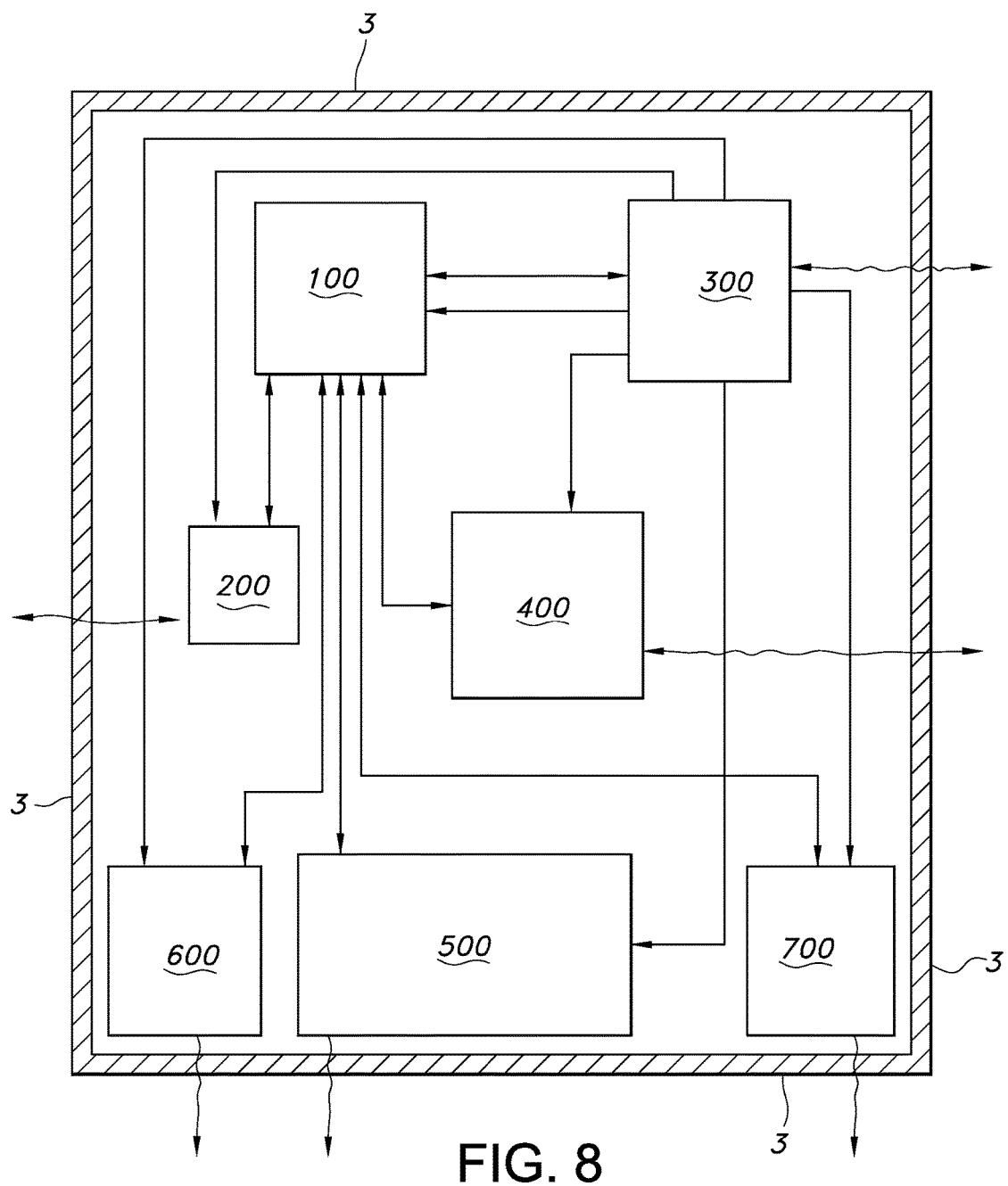
Figure 11:
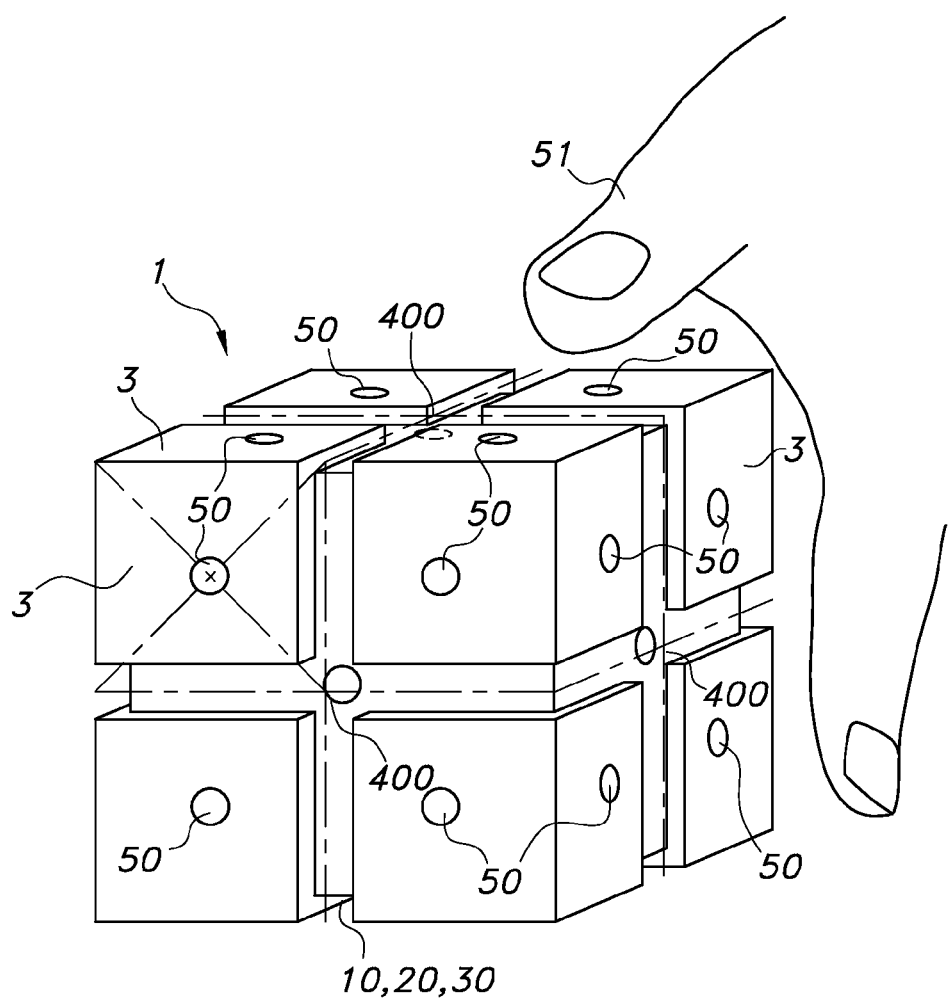

FIGS. 4A-7D relate to various possible motion modules, motion-guiding modules, motion-restriction modules and combinations thereof, in which in particular:

FIG. 4A-4L shows a combined motion module, motion-guiding module and motion-restriction module;

FIG. 5A-5C show a motion module based upon magnetic forces;

FIG. 6A-6D shows a separate motion module and motion-guiding module;

FIGS. 7A-7D show an alternative combination of motion module, motion-guiding module and motion-restriction module based upon piezo-elements;

FIG. 8 shows a schematic drawing showing modules that may be present in an element, and the interconnection between modules;

FIGS. 9A-9K Show the use of a separate, shared motion module;

FIGS. 10A-10H show a motion module that can change its orientation inside an element;

FIG. 11 shows an element that is going to be grabbed or was just released from a grip.

DESCRIPTION

In this detailed description of embodiments, elements have a general reference number 1, and will individually be indicated with letters 'a', 'b', . . . in order to distinguish them from one another. In the discussion, the reference number 1 will be left out when referring to element 'a', 'b', etc. The elements a, b, . . . can be identical. They can also differ in shape or functionality. The elements have a centre 2 (only indicated in element b of FIG. 1A). This centre can in general be a centre of mass (also referred to as "centre of gravity"), or alternatively a geometrical centre (also referred to as "centroid") of an object. If an element has a uniform density, the centre of mass is the same as the centroid.

Each element 1 can have one or more faces 3 that are adapted to allow an element 1 to be positioned on or against another element 1. In particular, the one or more faces 3 can be adapted to allow elements 1 to displace with respect to one another with the surfaces of face 3 in contact or almost in contact. In this detailed description, however, other options will also be demonstrated.

First, some examples of elements and displacement of elements with respect to one another will be demonstrated.

In FIGS. 1A-1F, three elements a, b, and c are of a triangular shape. In this embodiment, each element 1 has at least one face 3 with a surface that allows the elements to be in contact with one another and to displace with respect to one another over the surface of these faces 3. This at least one face 3 of elements 1 thus have a surface 3 that is adapted to allow for an element a, b, c to displace over another element a, b, c. In element b, a centre 2 is indicated. For the discussion, the nature of this centre 2 is not important: A centre 2 has a fixed position in its corresponding element 1.

FIGS. 1A-1F show an example six subsequent steps of element c with respect to elements a and b. Elements a and b remain at the same position and orientation with respect to one another.

Figure 1A:
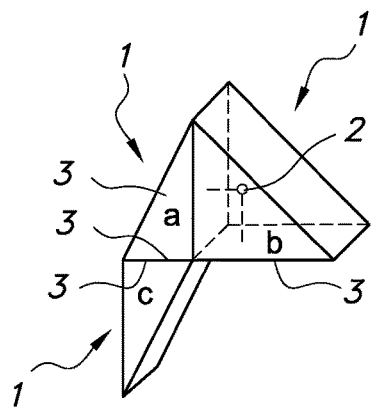
FIGS. 1A-1F are perspective views showing several subsequent steps of an example of mutual displacement of three elements.
Figure 1B:
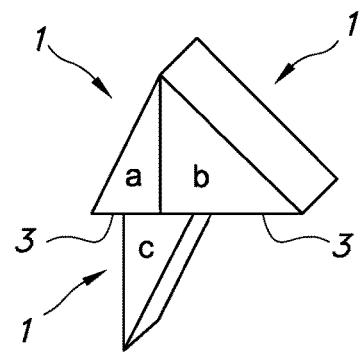
Figure 1C:
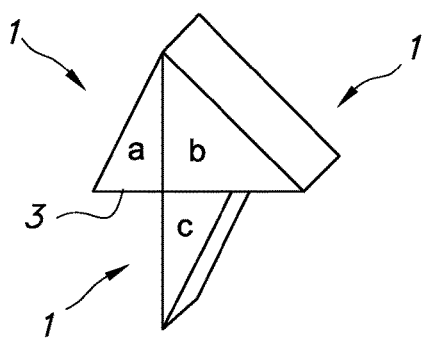
Figure 1D:
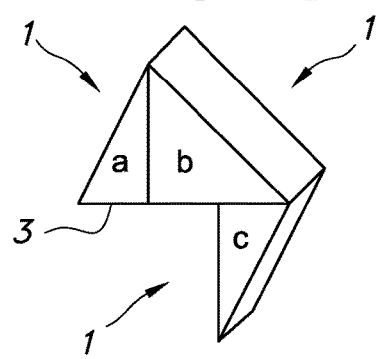
Figure 1E:
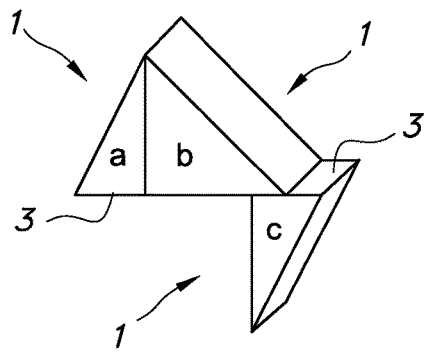

In FIG. 1A, starting positions of elements a-c are depicted. Element c starts from a position in which it is in contact with the surface of one face of element a only. Element c starts to move to the right side of the paper. In FIG. 1B, element c is moving to the right and is positioned between elements a and b, and continues to move to the right-hand side of the drawing. In FIG. 1C, element c is no longer in contact with element a, Element c now is in contact with the surface of a face 3 of element b only. Element c continues to move to the right side over the surface of face 3 of element b, and in FIG. 1D it arrives at an end of the surface of face 3 of element b. Element c is able to move on to the right and in FIG. 1E, it arrives at a position depicted.

In this position, halve the area of the surface of face 3 contacts the surface of face 3 of element b. Element b now starts moving in a direction into the paper and cross with respect to the earlier direction.

Figure 1F:
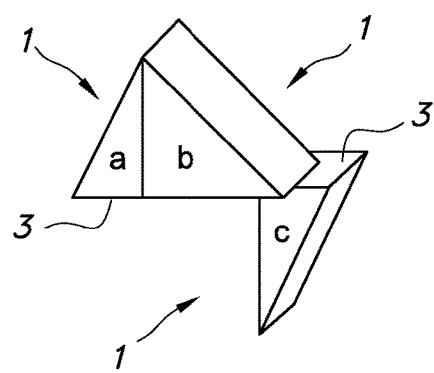

In FIG. 1F, element c is shown in a rest position. In this position, a surface of face 3 is only partly in contact with the surface of face 3 of element b.

In the example of FIGS. 1A-1F, the elements a-c exert forces on one another using the motion modules, motion-guiding modules and/or motion-restriction modules. These forces can be exerted mechanically, using electromagnetic forces, using chemical forces, and any other physical forces, or a combination of these. In case of a chemical force, a potential use of a reversible process which for example does not leave traces on a surface may prolong the usability for future movement along such a surface. When describing the movement phases it must be understood that movement may vary in speed and acceleration. Even an interrupted sequence of move, no move and move again is possible. When moving or not moving, an element may withstand one or more forces exerted upon that element (internal or external) selected from the group consisting of for example gravitational force, mechanical force, electrical force, chemical force and climate forces. A potential use for an element is for example on a different planet, in a fluid or in a vacuum like outer space.

Alternatively, element c is held on elements a and b via a mechanical means or via for instance magnetic force. In this example, the surfaces of the faces 3 of the elements a-c may actually be in contact with one another. Below, various embodiments of motion modules, motion-guiding modules, and motion-restriction modules are illustrated and which may be used for the motion shown in FIGS. 1A-1F.

Figure 2A:
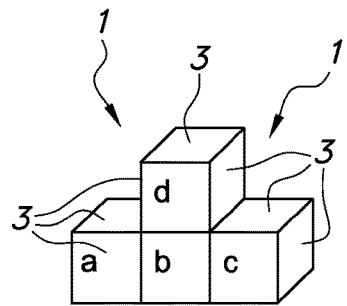
FIGS. 2A-2E are perspective views of several subsequent steps of another example of mutual displacement of in this case four cube-shaped elements.

In the example of FIGS. 2A-2E, four elements 1, indicated a-d, are shown. These elements a-d displace with respect to one another. The elements 1 in this example are identically shaped cubes. In this example, the faces of the cubes are solid surfaces and the cubes rest on each other's solid surface and can be under the influence of a gravitational field. A starting position of the elements a-d is indicated in FIG. 2A. If the displacement action indicated in FIGS. 2A-2E would be repeated, the construction of four elements a-d as a whole moves to the right.

In FIG. 2A, element a starts displacing along a surface of face 3 of element b in an upward direction. Element a thus displaces towards element d. In fact, centre 2 of element a moves away from the centre of element b and gets closer to the entre of element d when it moves in the upward direction.

Figure 2B:
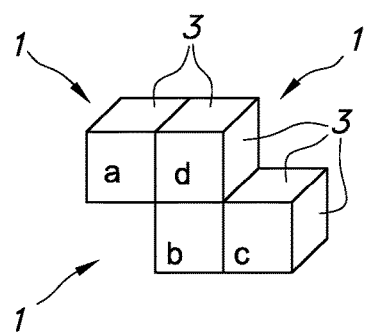

In FIG. 2B, element a arrived at a position closest to the centre of element d. Element a now no longer contacts element b. Now, elements a and d together start displacing to the right side of the paper. This may be done in several ways: Element a may couple to element d, and a motion module of either element d or element b starts acting on element d in the direction of (intended) motion. This results in a motion of elements a and d. When elements a and d displaced so much to the right that a surface of face 3 of element a now contacts part of the face 3 of element b. Now part of a motion module of element a may engage part of a motion module of element b. In such a stage, the combined motion of elements a and d may be caused using the motion module of element a, element b or element d, or combinations of these motion modules.

Figure 2C:
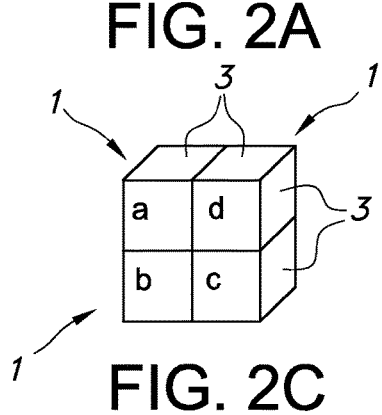
Figure 2D:
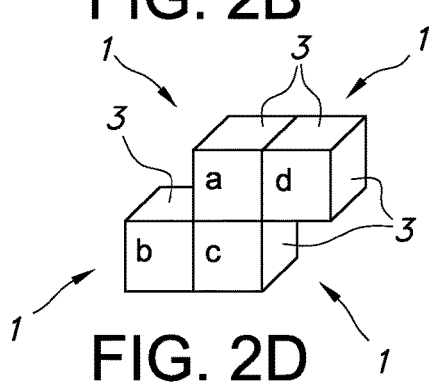

In FIG. 2C, elements a and d are exactly on top of elements b and c. Elements a and d continue to displace together to the right until the situation depicted in FIG. 2D is reached. There, elements a and d stop. Now, element d starts displacing in a downward direction, with its centre moving away from the centre of element a and towards the centre of element c. Again, this motion can be caused by the action of a motion module of element a, of element c or element d, or a combined effort of any of these motion modules.

Figure 2E:
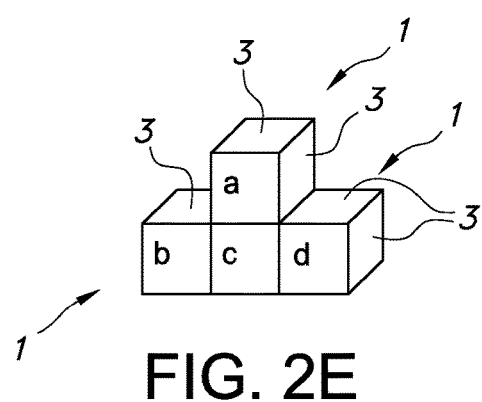

In FIG. 2E, the elements a-d are in fact in a similar external configuration. Thus, in fact the same construction as in FIG. 2A results, but displaced to the right with a displacement which equals the length of a side of an element. Next to having displaced elements a-d another additional aspect of the invention will be described: transportation. When an object is temporarily coupled to element a, for example placing a basket with material on top or inside element a; element a now uses it's own or the other elements movement ability to transport this other object from one position to another position. Alternatively, an element may comprise a build-in storage space. Thus, the element may functionally be or comprise a container for holding material.

In FIGS. 3A-3H, a construction of 18 elements 1 in fact changes its shape by moving elements with respect to one another. All the elements have an identical shape. The functionality of the elements may differ. Thus, the functionality of the new construction may also differ.

Figure 3A:
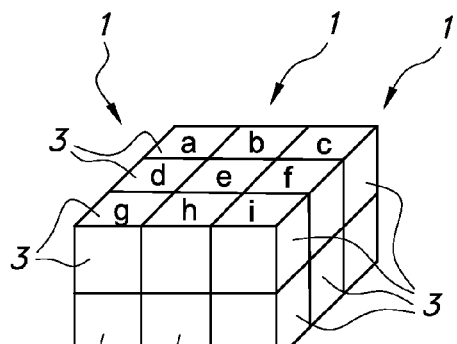
FIGS. 3A-3P are perspective views of several subsequent steps of another example of mutual displacement of in this case 18 cube-shaped elements, and in FIGS. 3N-3P 26 elements.
Figure 3B:
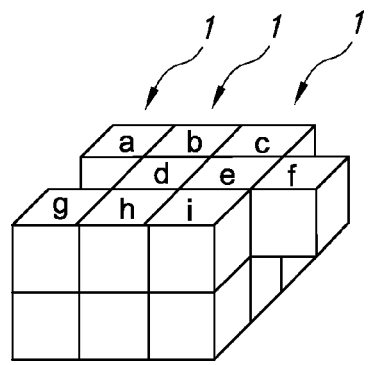
Figure 3C:
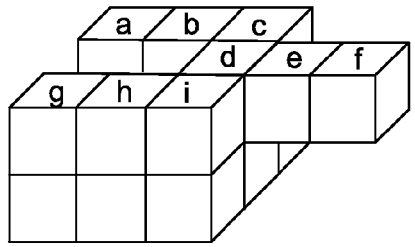
Figure 3D:
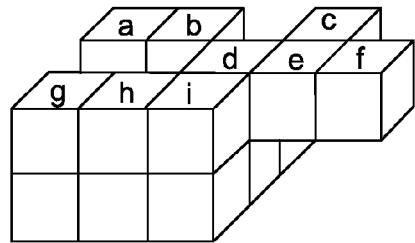
Figure 3E:
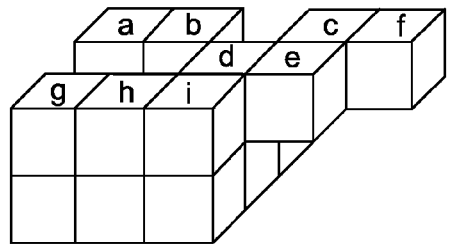
Figure 3F:
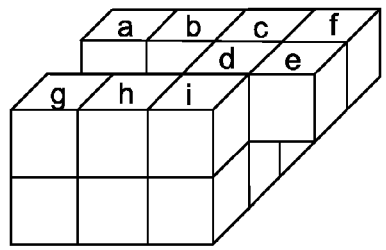
Figure 3G:
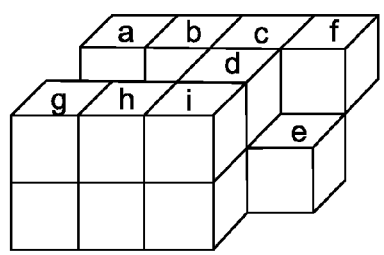
Figure 3H:
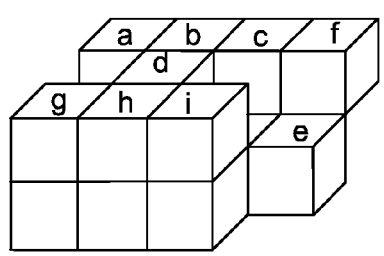
Figure 3I:
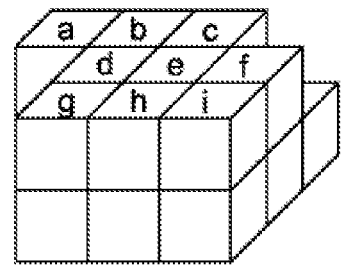
Figure 3J:
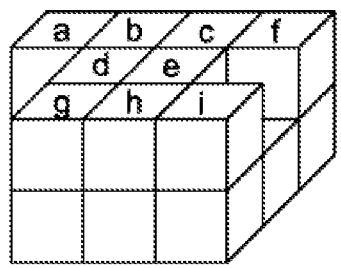

In the arrangement of 18 elements 1, the top 9 elements are indicated a-i. In order to get to a new arrangement of these elements depicted in FIG. 3H, many schemes are possible. FIGS. 3B-3G show several intermediate arrangements of the elements. One of these possible schemes is to first displace the complete row d-f two positions to the left (FIG. 3C), then displace element c to the left until its centre is closest to element e (FIG. 3D), then displace element f in a position where its centre is closest to the centre of element c (FIG. 3E), then displace the elements c and f to the left until elements b and c touch (and may lock) (FIG. 3F). Then displace element e down until it reaches the position shown in FIG. 3G. This can be done using the (or part of the) motion module of element d, f, the element below element d, and element e, or a combined action of a selection of these elements. Next, element d moves to the left until the configuration of FIG. 3H is realized. This scheme thus requires 7 steps, displacing a total of 4 elements (c, d, e, f) a total of 12 positions: when going from FIG. 3A to FIG. 3B, a displacement of three positions occurs, from FIG. 3B to FIG. 3C three positions, from FIG. 3C to FIG. 3D one position, from FIG. 3D to FIG. 3E one position, From FIG. 3E to FIG. 3F two positions, from FIG. 3F to FIG. 3G one position, and from FIG. 3G to FIG. 3H again one position. This adds up to a total of 12 positions. The same end situation or configuration of elements can also be reached in another way. This is shown in FIGS. 3I-3M. For ease of understanding, FIG. 3A and FIG. 3H are repeated in the drawings. First elements a-c are displaced together one step along elements d-f to the left as in FIG. 3I. Subsequently (FIG. 3J), element f is displaced in the direction into the paper until its centre is at its closest position with respect to the centre of element c.

Figure 3K:
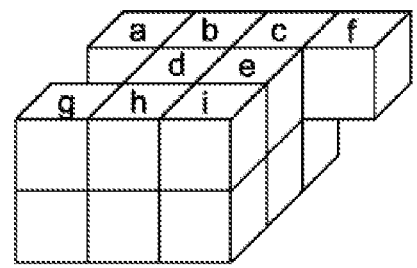
Figure 3L:
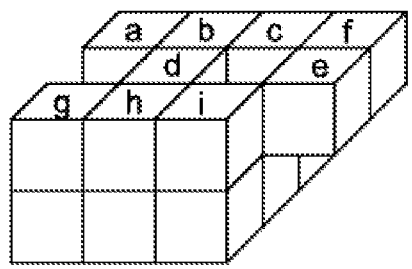
Figure 3M:
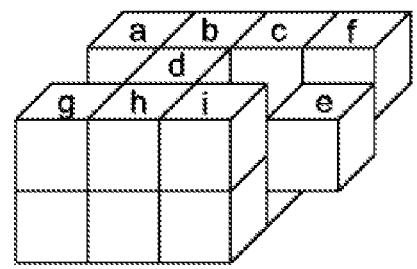

Next, in FIG. 3K elements a-f move as a group one position to the right. Alternatively, a, b, c, f move as one group and d, e move as a second group. Speeds may differ. Next, element e moves to the right (FIG. 3L). FIG. 3M depicts the intermediate position of element e while moving down; in this position element e uses element f and in parallel or sequentially uses the element on the left side of element e. Subsequently the composition of FIG. 3H is again realized. This scheme requires five steps (not counting FIG. 3M), displacing 6 elements (a-f) a total of 12 positions. The last scheme may require a smaller amount of (kinetic) energy, for instance element d has now been displaced only 1 position.

Figure 3N:
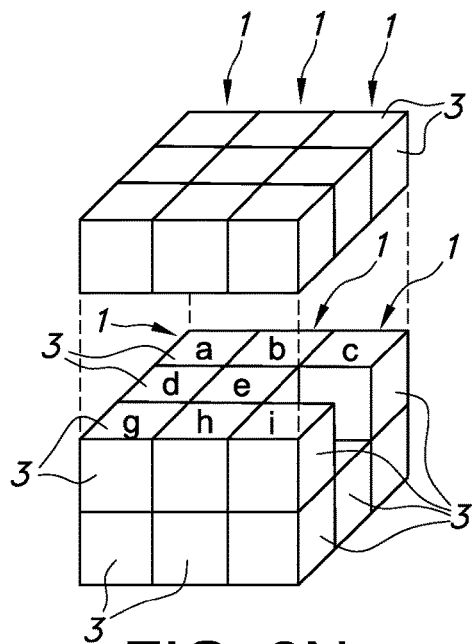
Figure 3O:
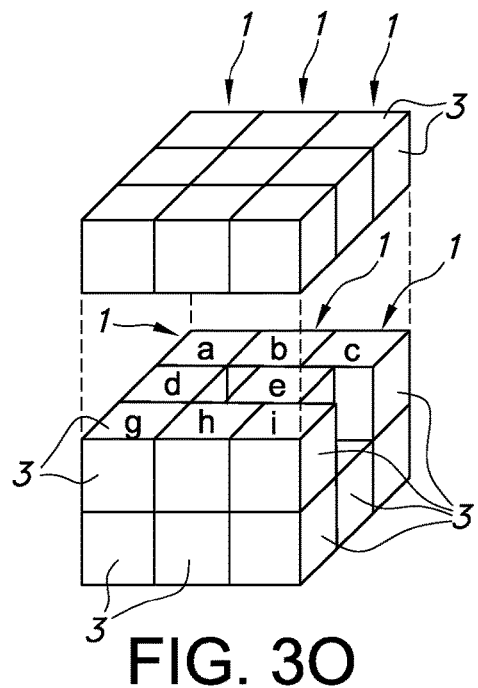
Figure 3P:
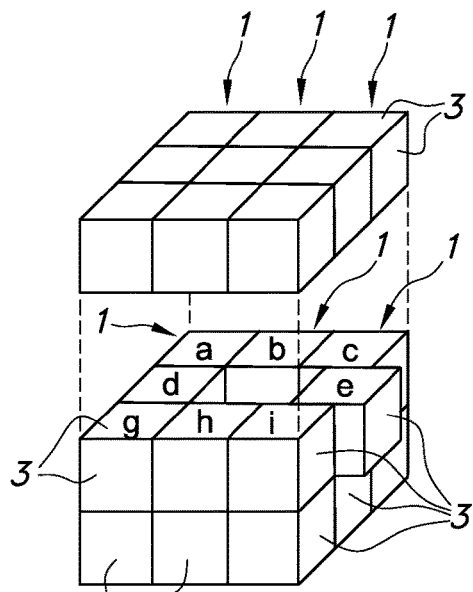

In FIGS. 3N-3P, it is illustrated how an element 1 can move when it is surrounded by other elements 1. Here, in FIG. 3N 26 element 1 are assembled into a single cube, with one free space in the right centre row of elements 1. The 26 elements thus form one object: a cube with one opening. In FIGS. 3N-3P, the top 9 elements 1 are lifted only for illustration purposes. Element 'e' is thus in FIG. 3N in face-contact with 5 other elements 1, including elements 'b', 'd,', and 'h'. The motion module, motion guiding module and motion restriction module in this embodiment allows the element 'e' to move to position 3O and further on to the position indicated in FIG. 3P while the other elements 1 remain at their position. Below, several examples are presented of embodiments of the various modules. These modules, or variations thereof, allow an element (or clusters of elements) that is (are) at several sides enclosed by other elements, to leave an object or displace within an object. In the example of FIGS. 3N-3P, the motion module of element 'e' will use the motion guiding module of at least one of the elements with which it is in 'face contact'. In an embodiment, in order to prevent element 'e' from getting blocked, element 'e' may use the motion modules of all but its faces 3 that are either facing away from a direction of motion, and its face 3 that faces the direction of motion. In a situation where the object is subjected to a gravitational force working in the direction towards the bottom of the drawing, it may be conceivable that only a motion module in/at the lower face (opposite the face that carries the identification 'e') is operative. To get to the position indicated in FIG. 3P, the motion module of element 'e' in an embodiment subsequently uses for instance motion guiding modules of the element 1 directly below element 'e' in FIG. 3N, and/or the element 1 below element 'e' in FIG. 3P, or a combination of the two if possible. Alternatively or in combination, element 'e' may also use motion guiding modules and/or motion modules of elements b, c, h, i if possible. In general, it may use motion guiding modules and/or motion modules of elements in contact with element 'e'.

When comparing end positions and the way that theses end positions are accomplished, several aspects can be taken into account. At a highest level, the performance of the system of elements as a whole may be evaluated. At a lower level, the performance for a group of elements may be evaluated. At the lowest level, the performance of a single element may be the subject of performance evaluation. These aspects for instance may have to do with the (in)equality of elements, element limitations, principles on how to handle forces acting upon an element and inter-element, required intermediate positions, principles used for navigation or problem solving, the speed at which a certain configuration of elements is being reached, energy consumption.

To achieve a certain position fuzzy logic, artificial intelligence, data mining techniques, machine learning, (path finding) algorithms, proportional logic, game theory, or other methods known in the field may be used. Elements may be steered or controlled from one or more central points. Alternatively, elements may be adapted to make their own decisions. In yet another alternative, elements may use distributed control. Thus, several degrees, levels or combinations between being steered or controlled and making own decisions are possible. Thus, an element or a group of elements can operate autonomously, for instance using data or information obtained from other elements and/or other sources. An element can have agent functionality and may learn from the feedback of its environment. An element may investigate, by computation, several potential actions or sequence of actions it is able to make. Subsequently, the element may determine either for itself, or for one or more other elements, which action has the highest benefit to the element, or to one or more other elements. It may then select that action or sequence of actions, and execute that action or sequence of actions. Furthermore, the timing of an action or sequence of actions may be taken into account: Elements may be planning their sequence of actions wherein the planning may take into account actions from other elements, or it may anticipate actions by other elements. Elements may receive only part of the information needed to accomplish a final configuration of elements and therefor need to communicate to other elements or devices. Client-server, master-slave, peer-to-peer, push or pull systems, polling, swarming- or other (hybrid) methods/technology may be used or adapted. Sometimes parallel movement (of individual elements or groups of elements) occurs next to sequential movement. So the movement of element d and element e to their final position could have occurred in one step from FIG. 3F directly to 3H at the same time instead of sequentially as described in the current FIG. 3F followed by 3G (movement of element e) and 3H (movement of element d). Sometimes a certain configuration of elements can only be reached by a method where one element is helping another element. A helper element can temporarily be inserted and used, then retracted from the other elements and thus not have a position in the final configuration of elements at all. Due to the reusability of the elements a large number of configurations of elements can be achieved over time. Well-designed elements do not have to be recycled but can be re-used, even for different purposes. This lowers the burden on our natural environment in several ways. If an element in an object does not function properly or is broke, it may easily be removed, for instance by actions of other elements, and replaced with a functioning element. The element may also be serviced.

A set of elements can assume a first configuration, and then move with respect to one another into a second configuration. Thus, the set of elements together are first in a first shape, and then in a second shape. This is also referred to as 'shape shifting'. In this process, the elements may be reused.

This shape shifting by displacing reusable elements allows for example the formation of a table from a group of elements. When at a later stage this table is not required any longer, at least one element from the group can be instructed to exert some form of control over, or to communicate to, at least one other element of the group. This can be direct, wireless, but may also be accomplished by for instance a messenger element which can be inserted or added and which transfers the message to an element out of the group and then returns. A task of the group of elements may thus comprise changing its current shape, for instance a chair, into a table, and back again into a chair.

Thus, the elements start moving with respect to one another. The constellation of elements that first fulfils the requirements of a chair shifts its shape to a constellation that fulfils the requirements of a table. The constellation of elements can then reorganise itself to fulfil the requirements of a chair according to input given or already available at an element. Thus the task of reusing the elements is executed by the elements.

Interaction with a human being exerting physical control, for example picking up, stacking, or replacing one or more elements, is not needed. This is a different method than building constructions with for instance Lego, in which human interaction is required. It is clear in this example that some form of intelligence or rules regarding mechanics, construction, architecture may be applied by an element or given to an element by a device, such that a person can actually use the chair to sit upon without the chair falling apart due to for instance the disintegration or disconnection of connected elements.

The elements can be physical at various scales. First, their size can vary. Their size may be comparable to playing blocks. Thus, an element may have a cross section of between 1-5 cm. An element may be a building block for constructing a building. In such an instance, a building block may have a cross section of about 5-50 cm. The elements may also be so small that the human eye can hardly discern the individual element. In such an embodiment, an element can have a diameter smaller than 1 mm. In particular, the diameter can be smaller than 100 micron. This may require the use of nanotechnology and for instance molecular or atomic motors. These elements can be used to build parts of this invention, as can larger elements the size of bricks or prefab concrete elements that may form a building. When leaving out the physicality of the elements, the elements can be simulated in order to determine or predict whether a configuration of elements can be achieved. In order to achieve a goal state when starting from a begin or start state, an element may need a combination of a program or app, with functionality which allow some functions to be performed. These functions steer actuators available in an element. Available sensors may give the element or the program input, potentially resulting in a different outcome of a function or a group of functions. These attributes and interactions as such may be known in the field of robotics.

From this a game or simulation, may be construed, which may be using physical or virtual elements or a combination of both. In such a game, it can be the task of a player to select the right program and the right functions/functionalities in order for elements to achieve a certain goal state out of a begin state. This game can be played by a human being alone, or by a computer. It may be played by at least one human being against at least one other human being or against at least one other computer, or a combination thereof Specific parameters measure the success; parameters like consumption of energy, speed, amount of moves of an individual element or of the group as a whole, amount of memory/cpu usage, strength of the goal state, or time required to reach the end state. When applying this with a certain degree of autonomy of elements and randomness for example by using artificial intelligence, the outcome may in advance not be known to a player. An overkill of regulating constraints to an element may restrict an elements ability to respond well to other situations/goal states; there may also be a trade-off between specialization and generalization. A player can for instance design on a game device a certain goal state and give certain elements selected properties: a selection from a group of programs, of actuators or motion modules, of sensors, of functions, of energy systems, and of communication systems. It must be understood that these properties of an element may act on other elements or devices. The design can be used by at least one element. The design is provided in part or as a whole to one or more elements and the elements start the displacement and depending upon the given properties the design, actually being a goal state can be accomplished or not. Changing the design allows for the elements to try to achieve another goal position. The elements can be physically or virtually, and displace themselves according to the given properties. Elements may be configured in order for the elements to exchange at least one property or functionality with one another or with another device. Elements may comprise memory in order to recall previous situations or compute potential future situations. This as such is known in the field of computer science. A goal state can be defined in different ways. For instance, the outer boundaries of a set of elements can be used as a goal state. For example, the end shape is a cube, or a plate.

The goal state may be functionally defined at element-level. For example, each element must have at least one face in contact with another element; each element must have at least 2 faces free.

A goal state may also be a list of locations, absolute or relative to other elements, of elements, or for instance specific elements have predefined end positions, again either relative, absolute, or a combination of both.

A goal state may also be represented by a mathematical function, general or mathematical demands or requirements on an assembly of elements, for instance, the assembly or configuration of elements must have a particular plane of symmetry, a hollow space inside, a defined circumference, a defined volume, number of layers, etc.

A goal state may also be functional. Elements having a defined functionality or property are at a certain position. Or the position should be such that the function is optimized. For instance, elements having a photovoltaic face should be located and/or positioned such that their production is maximized. The goal state may even evolve, change or be modified, even during the motions of elements towards the original goal state. The goal state may for instance change due to environmental influences, like day/light rhythm, temperature, etcetera, or may be time-dependent. A goal state may also be a negative definition, or be an exclusion.

Additionally, outside interaction may be possible. For example, inserting or removing an element to or from a certain state. This may be done physically for instance by a human being by using his/her hand. When done by taking into account how elements may attach/interact to one another, an element adjacent to a newly added element may notice/sense this interaction and use this for its own and potentially for other elements' behaviour in the configuration of elements. When going back to the example of designing a goal state on a device, the inserting or removing of at least one element may be taken into account by that device as well. Alternatively, a predesigned goal state may be used.

An example of this is a child designing a castle using the elements. Imagine the child using a computer device. There are many examples of usable devices. For instance a handheld device, such as for instance a handheld device comprising a (touch)screen. An example of such a device comprises a smartphone, an iPad, a smart watch or similar device. These devices may receive user input via a touchscreen, voice control, receiving muscle or nerve input, or other input means.

Suppose a castle is constructed using elements. Physically, the castle formed in a room by action and displacement of the elements themselves. After or during said formation, the child extends the castle by physically adding two more elements. A device may for instance comprise an "app" running on a device like the iPad, which receives information from an element forming part of the castle that the two elements are added. The child may save his/her altered version of the castle. When done playing, the child instructs the elements by means of the app to move to a certain begin state. Such a begin state may be compact so that his/her room may be used for other purposes. This example may then use wireless communication or multiple devices, like for instance multiple iPads, which are used to make a joint configuration of elements even at remote or uninhabited locations (like on planet Mars).

Another goal may be the following. Due to for instance displacement or a change or orientation of one or more elements, conditions may be optimized. For example, the elements may optimize growing conditions for plants. This may be achieved by for instance physically moving one or more plants, providing shade by covering the sun. Two assemblies of elements can displace two plants or groups of plants with respect to one another in such a way that the growing conditions for both plants are optimized. In an embodiment, elements may form a container, for instance a pot, holding the plants. In such a container, one or more elements may for instance provide an opening in the container for allowing excess of water to flow out of the container. Parts of the container may form a sunshade, or the elements may completely move the plant.

Communication may replace a certain type of sensor functionality. An element may use a sensor to detect only its direct neighbour. Alternatively, a sensor may be able to detect another element two positions further, or an element may ask or receive information from an other element if that other element is in contact with the element two positions further. Sensors can use contact/proximity detection by using the electromagnetic or the audio spectrum.

Another example is when two users play a game on for instance two separate devices, for instance on two iPads, two users play a game in which reaching a certain given goal state physical or virtual is the purpose of the game. As described earlier, this can be accomplished by selecting the right properties, functionality or tools for the elements. In this game there may be limits on certain properties or limits on how many different element configurations can be used for a certain goal state when playing a level of that game. An approach akin to the program Minecraft or other virtual worlds can be accomplished with for instance the difference that the current elements may physically build what is virtually designed when using design rules applicable to a physical element.

In FIGS. 4A-7C, various embodiments of motion modules, motion-guiding modules and motion-restriction modules are illustrated. These embodiments are examples showing ways to work the invention for physical elements 1.

Figure 4B:
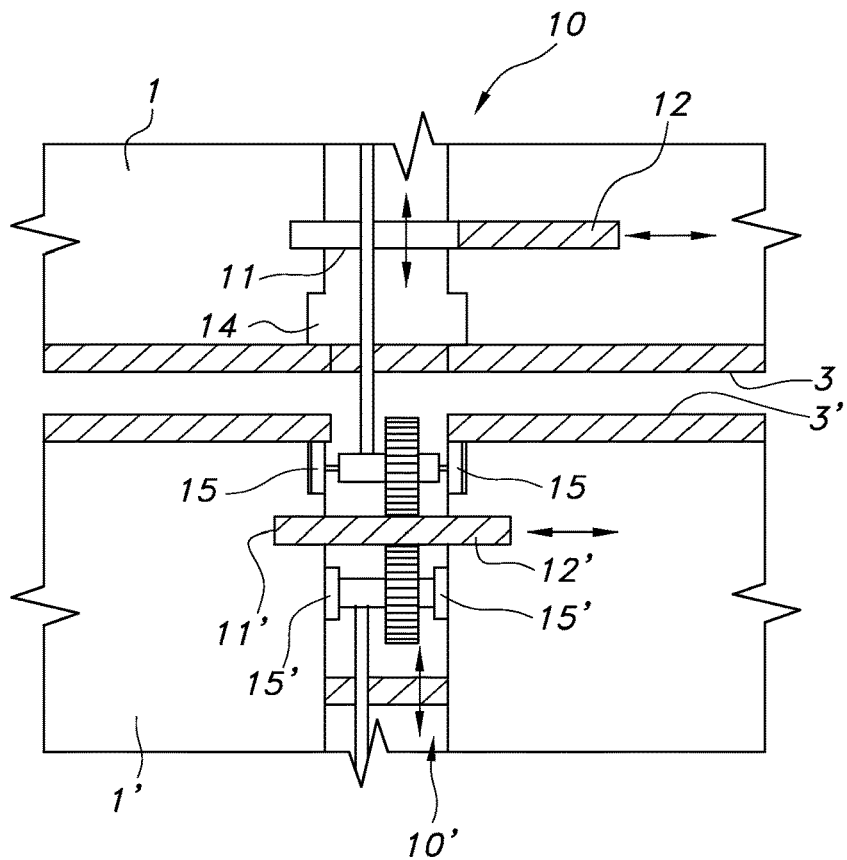
Figure 4A:
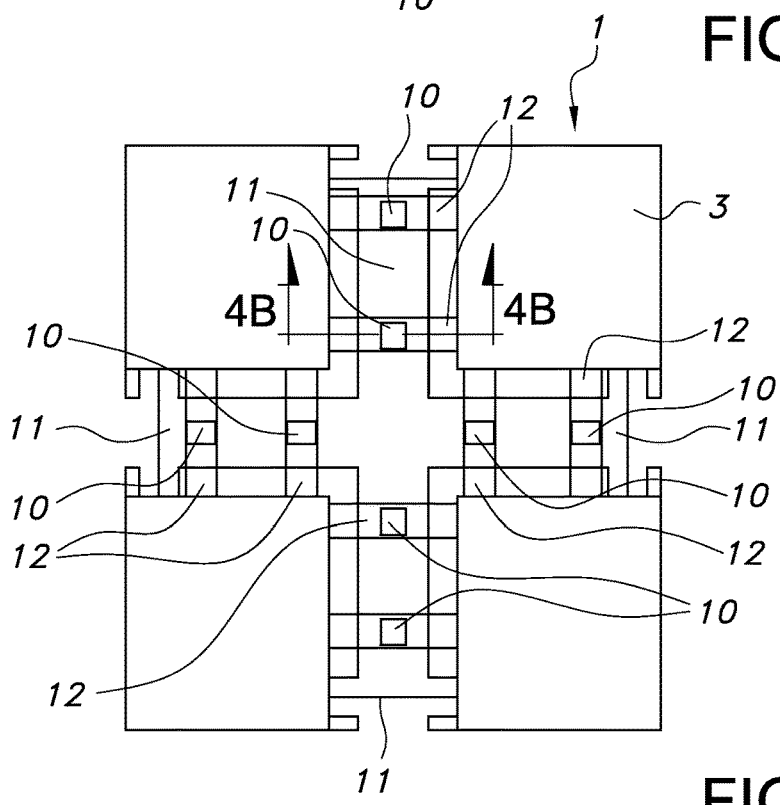
Figure 4C:
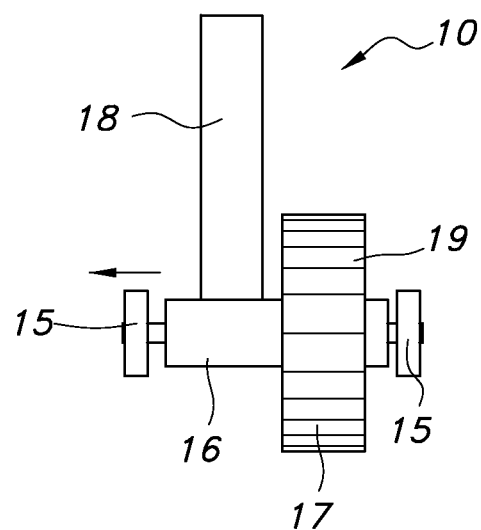

In FIGS. 4A-4C, a cross-sectional view, detail and top view are shown which illustrate a mechanical solution that combines a motion module, a motion-restriction module and a motion-guiding module. In FIG. 4B, a cross section is shown of parts of two elements 1, 1' that are positioned on top of one another. Faces 3 are almost in contact. In fact, if their surfaces have little to almost no friction, the surfaces can in fact be in contact. Otherwise, one of the three modules (motion, motion-guiding and motion-restriction) will cause a little distance between the faces 3.

In the embodiment of FIGS. 4A-4C, an embodiment of part of two elements 1 is schematically shown. Part of the motion module 10 of element 1 is a retractable wheel. Another part of the motion module is the part of track 11 that provides an engagement surface of the tread of the retractable wheel. The track 11 further provides part of the motion guiding module and of the motion restriction module.

Element 1' has in this embodiment the same modules. FIG. 4A shows one element in top view, and FIG. 4B shows a cross section of FIG. 4A as indicated, but with a second element on top of it and also cross sectional view.

In FIG. 4B, the retractable wheel of element 1 extends and engages a motion guiding module of element 1', here track 11' of element 1'. Retractable wheel 10' of element 1' is here in its retracted position. Retractable wheel 10 of element 1 in its extended position engages track 11'. In element 1, in order not to hinder the retractable wheel 10, a slidable cover 12 is in its inactive position. It slides here to the right in the drawing. Element 1' has its slidable cover 12' closed. In this embodiment, the cover 12' together with track 11 provides a continuous track. The track 11 is sunken with respect to the surface or face 3. In FIG. 4C the motion module is shown in more detail. The motion module 10 comprise retractable wheels, comprising a strut 18 coupled to a shaft 16 that is cross with respect to strut 18. In this embodiment, shaft 16 carries wheel 17. A driving motor for the wheel 17 here is an electromotor 19 that can be provided as a rim motor inside wheel 16. Alternatively, the electromotor may be provided in shaft 16. Here at opposite ends of shaft 16, parts 15 of the motion-restriction module are provided that many be extended and retracted in the axial direction of shaft 16. In extended position, it can engage in a groove 14 (FIG. 4B), and in retracted position the motion module 10 can be retracted.

Figure 4D:
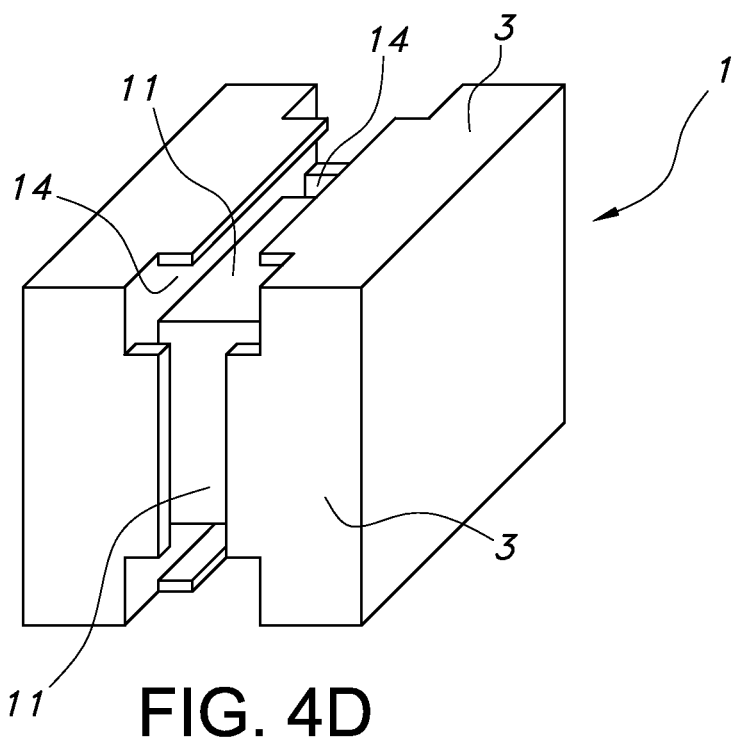

In FIG. 4A, only one face of an element is shown. In an embodiment, of which parts are already discussed above, the element 1 may be a cube. Such a cube can be provided with six similar faces. In fact, the six faces may also be identical. In the embodiment of FIG. 4A, a face carries a cross shaped track. Here, the centre of the cross is located at the centre of the face. In an embodiment, the element may have further faces that are provided with a similar, cross-shaped track. In order for elements to be able to displace with respect to one another in a flexible way, the track on one side functionally connects to the track on another, neighbouring face. In the example of FIG. 4D element 1 has one single, closed, sunken, track that runs all around four sides or faces of the element 1. In this drawing, groove 14 differs from the embodiment of FIGS. 4A and 4B. One of the walls of the groove 14 runs equal with the surface of track 11. In the embodiment of FIG. 4A, the element has at least two tracks. These tracks have two crossings at opposite faces, and in FIG. 4A one of the crossings is visible.

Figure 4E:
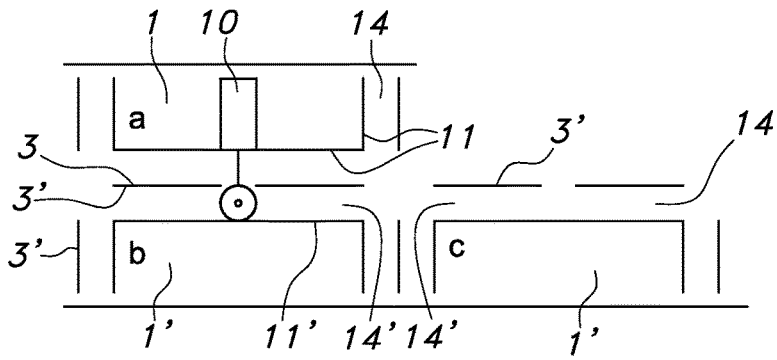
Figure 4F:
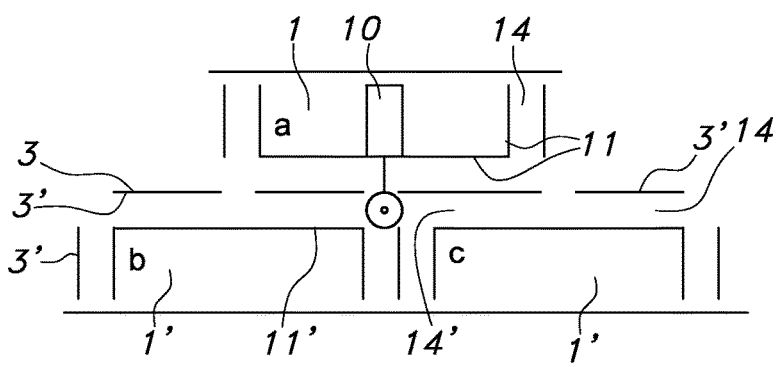
Figure 4G:
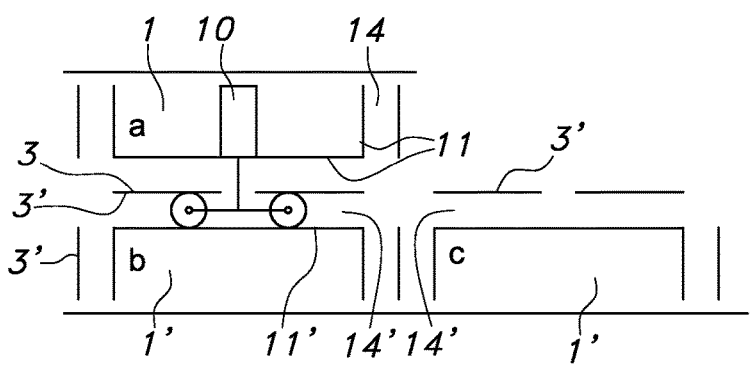
Figure 4H:
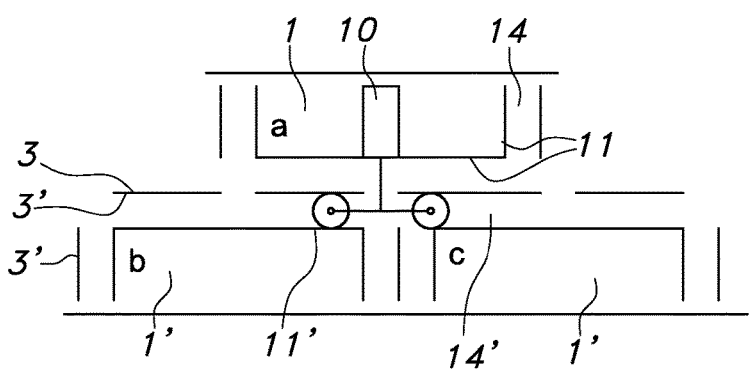

Now suppose two elements 1 of the type shown in FIG. 4A that are positioned with their face in contact. In order for a third element having the wheel as shown in FIG. 4B to move over the face of one element 1 and continue over the neighbouring element 1, A similar neighbouring element must have a similar sunken track at the same level to allow the moving module to traverse the two gaps (each element causing one gap. It may also be seen as one single gap). FIGS. 4E-4L schematically depict 3 elements 1; a, b and c, in a cross-section parallel through the centre of the tracks of the elements. The gaps in the lines resemble the gaps of FIG. 4D of the closed track around the element. FIG. 4E shows that the extended wheel module 10 of element 'a' is running in the track of element 'b'. FIG. 4F depicts the situation where the wheel module 10 tries to traverse the first gap. It is obvious that there is no traction by which the wheel module can displace element 'a' any further in the direction of element c by itself. One or more helper elements 1 attached to element 1 'a' may in this case solve that problem. Potentially the element 1 of FIG. 4D has a different motion module 10: a motion module 10 with multiple wheels (FIG. 4G). First such a motion module 10 extends towards the track. Subsequently the motion module 10 extends its wheel base length and two wheels will be following the track. In this embodiment, a frame connecting both wheel axes extends. The wheels in FIGS. 4G and 4H may have half the width of the single wheel of FIG. 4E. In that way, these wheels if the embodiment of FIGS. 4G and 4H can slide out of one another and fit into the track. The distance between the rotational axes those two wheels is such that the two wheels span the two gaps, which is depicted in FIG. 4H: When one wheel has no traction, the other wheel has traction. The distance between the rotational axes of the two wheels may be set. These two wheels may be jointly or independently of one another use a motorized part.

In another embodiment, multiple motion modules 10 are provided at a certain distance from one another. This allows for movement while one of the motion modules 10 crosses the two gaps and another motion module 10 moves over track 11 (FIG. 4I-4L).

Figure 4I:
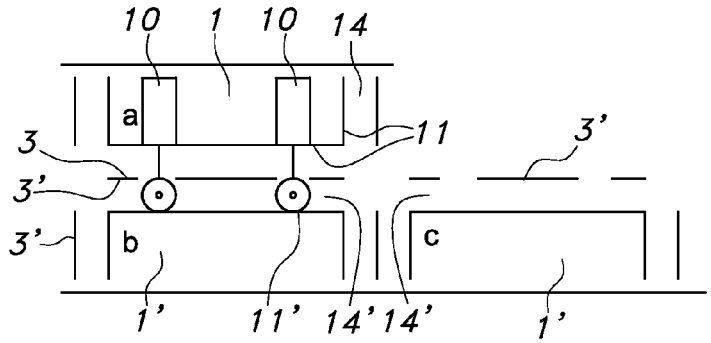
Figure 4J:
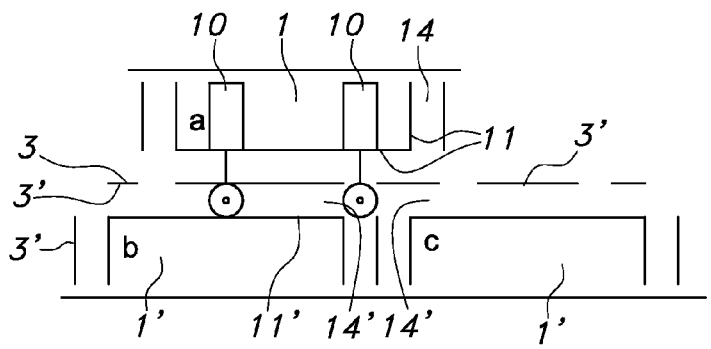
Figure 4K:
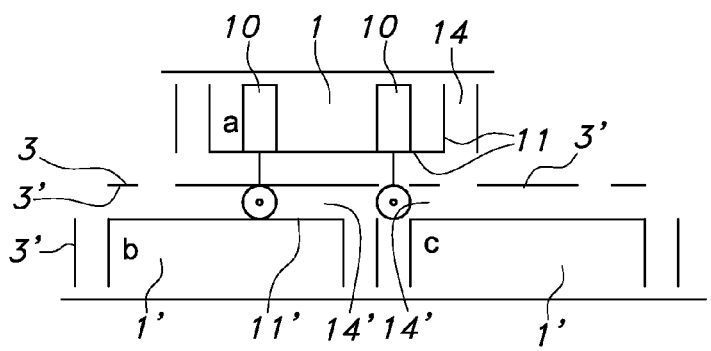
Figure 4L:
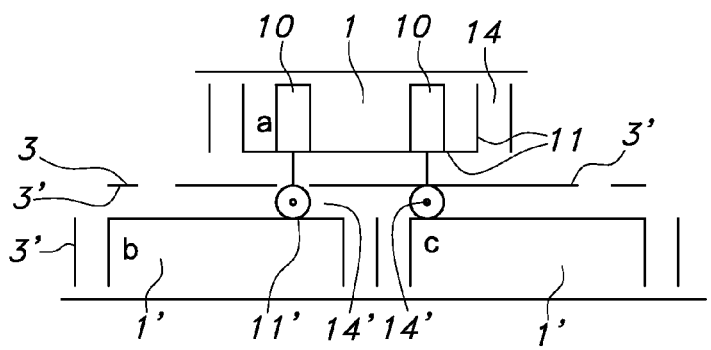

FIG. 4I shows an element 1 having two extended motion modules 10 which are moving element a on element b and towards element c. In FIG. 4J the right wheel has no traction any more, due to the first gap. The left wheel uses its power to continue the displacement of element a. In FIG. 4K the second gap is reached. Still, the left wheel engages element b and pushes element a further towards element c. In the situation of FIG. 4L, both wheels have traction again: with the left wheel engaging element 'b' and the right wheel engaging element 'c'. The wheels may change roles if element 'a' is completely on top of element 'c'.

In the embodiment of a cube-shaped element, in fact three continuous tracks are provided that encircle the cube and that cross one another. Each track usually crosses the other track at two crossings. In fact, more tracks are possible that each have other advantages. In particular, an embodiment will be demonstrated in which one or more tracks can be made over a face at almost each chosen path over the face. In this document, such an embodiment is provided using magnetic parts. Specific other layouts of track that are mentioned here are providing a face with two sets of two tracks. Each set crosses the other set. The tracks of a set can be provided symmetrically with respect to the centre of a face. Thus, in fact the tracks are laid out in the shape of a #-sign. In particular, two sets of parallel tracks are perpendicular with respect to one another. When providing a cross-shaped track an element, in particular when it is a cube, can usually only move on another element when a face of both elements face one another, are parallel to the direction of motion. In particular, these faces are in-plane. Thus, when another motion is required, the help of another element may be needed. An advantage of the cross-shaped track is the relatively simple layout. Furthermore, motion can be provided using a single motion module on each face, at the crossing of a track. Thus, in the embodiment of a cube, six motion modules may be needed to enable full motion capability. In the embodiment of FIG. 4A, each track 11 is provided with four motion modules. This may be needed to provide sufficient traction, supple motion. Other placements of motion modules in the track may be possible, and another number of motion modules per track may be used. In a simple embodiment, already mentioned, one motion module at a crossing of a track may be sufficient under certain conditions.

FIG. 4B shows in schematic cross-section an embodiment in which a motion module 10 is shown in more detail. In this embodiment, a part of the motion module 10 is an extendable driving unit that can move up and down with respect to a face 3, 3'. It can be retracted, leaving the face 3 free, and it can be extended in order to extend beyond the surface of a face 3 and to engage a track 11 of another element.

In this embodiment, many ways can be devised to provide a motion-restriction module. Furthermore, many ways can be found to provide a motion-guiding module. In this embodiment, a mechanical solution is presented. Thus, part of a motion-restriction module and a motion-guiding module are provided using a set of grooves 14 at both sides of track 11. The grooves 14 here provide opposite normal abutments working along a line normal to the face of an element, and opposite transverse abutments working along a line in-plane with respect to a face and cross with respect to the track. In a simple embodiment, the grooves 14 have a rectangular cross section. Here the grooves are parallel to the face, and parallel to track 11. Thus, the grooves 14 together provide part of a motion-restriction module and a motion-guiding module. In fact, grooves 14 can be seem as partly undercut grooves, comprising an undercut at both opposite longitudinal sides of the groove 14.

In this embodiment, another part of a motion-restriction module and a motion-guiding module is realized through parts 15 running in the grooves 14. The parts 15 run in grooves 14 and provide abutments in the grooves 14. The various principles shown here can be combined.

In FIGS. 5A-5C an alternative embodiment for the motion module, motion guiding module and motion restriction module is demonstrated. This embodiment demonstrates an embodiment that avoids mechanical means for realizing a motion module, a motion-guiding module and a motion-restriction module. Parts of a non-mechanical embodiment and a mechanical embodiment may be combined. This embodiment uses magnetic force. To that end, permanent magnets and switchable magnets may be combined.

The following embodiment can be realized in an element. In FIG. 5A, the elements 1, 1' both comprise at least one strip of magnets 40 that can be switched on and off. Thus, the parts in a strip can be selectably activated. In this way, the strips in two elements can together form a distributed linear motor. In fact, the principle of a linear motor as such is known in the art. In this embodiment, such a linear motor is split into two separate parts. This allows the motor to function as a motion module. Using the magnetic force, the opposite strips 10, 10' in two elements that are on top of one another with their strips above one another can even provide at least part of a motion-guiding module.

In this embodiment, additional strips can be provided at the surface of an element. In an embodiment, two strips can be provided in/at a face of an element. These strips can be substantially parallel. Thus, the strips can function as a motion module and a motion-restriction module. In an embodiment, two elements 1, 1' are positioned one on top of the other. Both elements comprise two strips of selectably activatable magnets 40 and that are parallel with respect to one another. The strips of the one element are furthermore substantially parallel with respect to the strips of the other element. Now, if several opposite parts of the strip of two elements that rest on top of one another are actuated in an opposite way, the strips can even provide a motion-restriction module. When activating the parts in one element in an opposite way with respect to parts in the strips of the other element, parts of the strip of one element are poled in one way, for instance north or south, and these parts are opposed by opposite poles, i.e., respectively south or north, of parts of the strip of the other element. Thus, the strips now attract one another. In the embodiment described, a mode is illustrated in which both elements change the polarity of their magnets and cooperate. In an alternative mode of operation, one element can change the polarity of its magnets, while the other element leaves the magnet poles static. The magnetic force of the magnets may be adjustable.

The elements may be provided with at least two strips of magnet parts 40 at or near one face 3 and that are provided substantially in a cross. As such, this is discussed above in a mechanical embodiment. It may also be possible to provide several strips at one face.

The use of selectably switchable magnet parts 40 can even be provided in the following embodiment, providing control over the motion with respect to one another of two elements that rest one on top of the other. In FIG. 5C, an element is provided with a two-dimensional (2D) grid of selectably activatable magnet parts 40 or magnet patches. Magnet parts 40 may be integrated into the surface of a face 3 of an element 1, but may also be provided below the surface of a face 3. When elements 1, 1' are placed one on top of the other with the faces 3, 3' contacting one another, and the magnet parts of the elements are activated in a controlled manner, this can provide a 2D motion module. When opposite magnet parts 40 are activated in an opposite way, the 2D magnet parts 40 that are provided in a grid provides a motion-restriction module. By selectable activating magnet parts 40 in a 2D grind in one element 1 and in the opposite element 1 resting on to of element 1, the magnet parts 40 in both 2D grids interact. When opposite magnet parts are poled oppositely, two elements are attached and stick together. When subsequent magnet parts are activated, the effect of a plane-motor is realized. Subsequently activating magnet parts along a line over a face 3 will move elements 1 with respect to one another along that line. In fact, the 2D magnet parts thus also provide a motion guiding functionality. Faster motion may be achieved by activating groups of magnet parts 40.

The 2D grid of magnet parts 40 and the strip of magnet parts 40 may be combined.

The magnet parts 40 may be provided below a low-friction surface of a face 3. For instance, a polymer material may be used. In particular, PTFE or a similar low-friction polymer material may be used.

In addition to the at least one strip and/or the 2D magnet parts grid, at least one mechanical motion module, motion-guiding module and/or motion-restriction module may be provided. For instance, a mechanical motion-restriction module may be activated to at least temporarily fix the position of two elements with respect to one another in a way that does not require the use of an energy source.

Figure 6A:
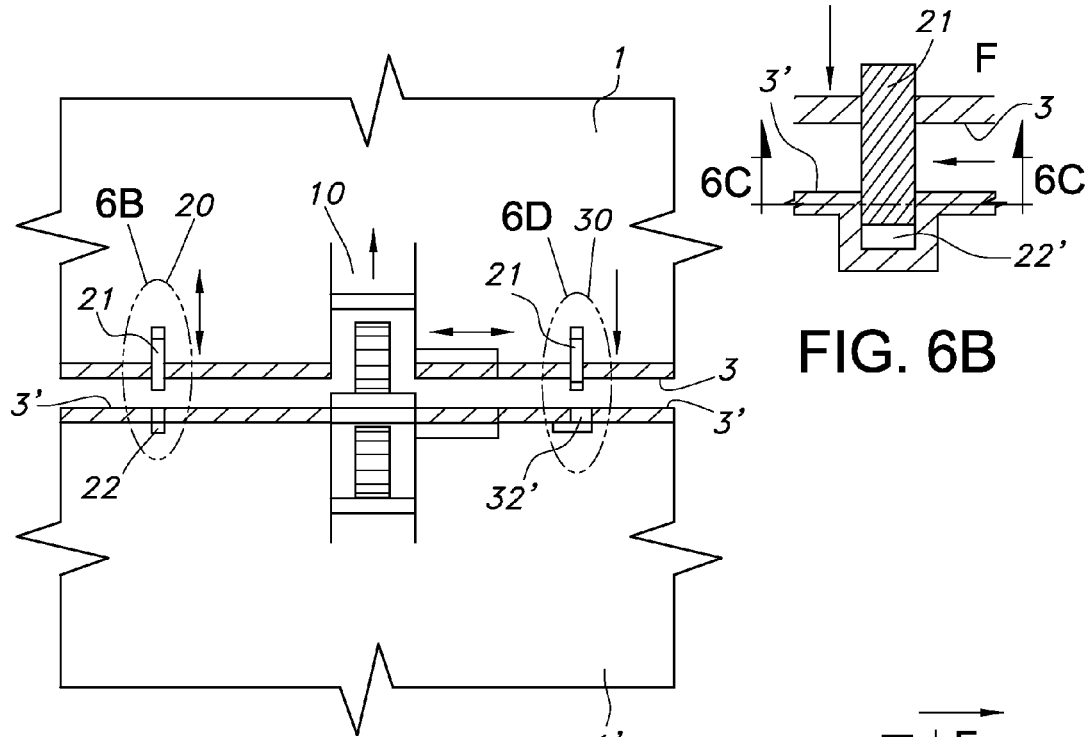
Figure 6B:
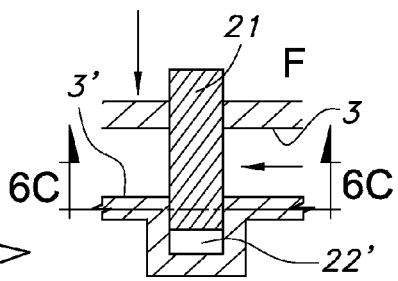
Figure 6C:
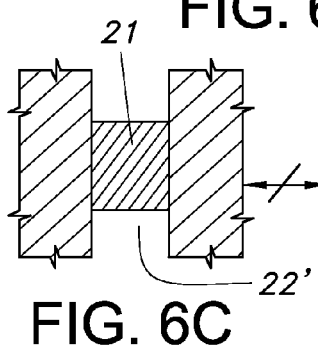
Figure 6D:
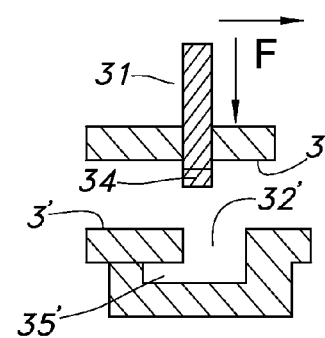

In FIGS. 6A-6D, schematically a mechanical embodiment using a separate motion module 10, a motion-guiding module 20, FIG. 6B in cross section en FIG. 6C in further cross section as indicated in FIG. 6B) and a separate motion-restriction module 30 (FIG. 6D in cross section) is shown.

The motion module comprises a caterpillar track in each element 1, 1'. Caterpillar tracks 10 here engages caterpillar track 10'. In caterpillar track 10, one driving wheels or elements extends in normal direction or face 3 until it engages the caterpillar track 10'. The caterpillar track may be one linear track along a face 3, and alternatively it is a pair of crossing caterpillar tracks laid out like in FIG. 4A.

The motion-restriction module 30 here is an extendable pin 31 that first is activated to extend out into a slot 32 in the opposite element. When pin 31 extends in slot 32, it rotates about its longitudinal axis. Thus, a cam 34 extending from pin 31 in transverse direction is rotated into undercut opening 35' in slot 32'. Can 34 thus hooks into undercut opening 35'. It holds the distance between the elements 1, 1'. This holds element 1 in position with respect to element 1'. In an embodiment, slot 32' is a groove running along face 3 and having an undercut groove 35', thus motion-restriction module keeps the elements on top of one another during motion. Both elements 1 and 1' can both have parts of the motion-restriction module.

Motion-guiding module 20 of element 1 here is a simple, straight pin 21 running in a groove 22' in an opposite element 1'. Thus, a trail along face 3 is defined. In an embodiment and to guide motion even better, the transverse cross section of pin 21 is rectangular, in particular square. It fits in groove 22'.

In FIGS. 7A-7D, yet another alternative embodiment of the motion module, motion-restriction module and motion-guiding module is schematically shown. This embodiment is based upon the use of piezo-elements for realizing parts of the modules mentioned. 'Piezo' is used to refer to an element using the piezoelectric effect. As such, there are principles like linear motors that are suited for application in the elements. In this embodiment, one type will be discussed.

In this embodiment, a rail 80 is provided. Furthermore here four piezo modules 70 are provided. The piezo module is extendible, in FIG. 7B, a cross section as indicated in FIG. 7A shows the piezo module 70 of element 1 in retracted position and piezo element 70' in element 1' also in retracted position. The piezo modules 70, 70' have two U elements that are interconnected by a piezo piece 72. When activated, length L changes and the distance between the U-elements also changes. FIG. 7C shows a top view of a piezo module 70, and FIG. 7D shows a side view of the piezo module 70. The distance D between legs 71 and 71' is such that it fits over the thickened part 83 of rail 80. The inner parts of legs 71, 71', in particular the outer ends, are here provided with clamping piezo elements 73, 73'. When activated, these piezo elements 73, 73' move inward and reduce the space D between legs 71, 71'. Thus, allowing the legs 71, 71' to clamp on the sides of rail 80, in the undercut grooves 82, 82'. Thus, when piezo elements 73, 73' are activated, piezo modules 70, 70' are fixed onto rail 80. Motion of piezo module 70 over rail 80 is possible by subsequent clamping of the U elements. If activation of piezo piece 72 is out of phase with the activation of the U elements, motion is possible.

Thus, here the piezo module 70, 70' together with rail 80 is motion module, motion-restriction module and motion guiding module.

Alternatively, the motion module may be based engaging elements using a hoist, winch, rack and pinion, chain drive, belt drive, rigid chain and rigid belt actuators which all operate on the principle of the wheel and axle. By rotating a wheel/axle (e.g. drum, gear, pulley or shaft) a linear member (e.g. cable, rack, chain or belt) moves. By moving the linear member, the wheel/axle rotates. Thus, elements may be put in motion with respect to one another.

In FIG. 8, a schematic cross section of an element 1 is shown, indicating the various components that may be present in an element 1. In this cross section, four faces 3 are indicated. Element 1 comprises a data processing unit 100, a data communication unit 200, an energy unit 300, a sensor unit 400, a motion-restriction module 600, a motion module 500 and a motion-guiding module 700. Next to these modules other modules may be present: for example an actuator which can move or rotate a retracted motion module within the element 1. The data processing unit 100 may be able to work together with other data processing units 100 of other elements 1 and distribute computational tasks to one another; This may be done in the form of distributed computing or cloud computing.

The waving arrows indicate that the various modules and/or units can interact with the environment outside the element 1. For instance, a sensor unit 400 can measure a physical parameter outside an element 1.

An energy unit 300 may be charged from a source outside element 1. Charging may be wireless, for instance inductive, or using conductive surface patches, for instance.

A data communication unit 200 may transmit data to outside an element 1, or be able to receive data from outside an element 1. This may be data transmitted by another element 1. It may be an element that is in contact with element 1. Data communication may be analogue or digital, be wireless via the electromagnetic spectrum, via sound or via other known wireless data transmission protocols, for instance Zigby, Bluetooth, WIFI, Near Field Communication (NFC) or the like. Alternatively, data communication may be physically using conductive patches on the surface of the face 3 of an element. Using a sensor like a (digital) camera and analysing data taken by the camera is also a potential form of data communication; known examples are for instance QR-codes or bar-codes. Communication can go across several degrees of distances, even inter-planetary. The energy unit 300 in this embodiment provides energy to components (modules and/or units) in the element 1. This is indicated by single arrows running from the energy unit 300 to the other units and/or modules. An energy unit 300 may be an energy storage unit, for instance a chargeable battery, an accumulator, a capacitor, for instance a super capacitor, or the like. Alternatively, the energy unit 300 may also be a power generator, which generates power. Examples of such an energy unit 300 are a fuel cell, a combustion engine, a photovoltaic element, or similar energy unit 300.

A sensor unit 400 may comprise one or more sensors that are able to detect a physical parameter. Examples of suitable sensors are a temperature sensor, a proximity sensor that detects the presence and/or distance of another element. A pressure sensor, an air-pressure sensor, a light sensor, a location sensor (GPS), a motion detecting sensor, an accelerometer, a moisture sensor, a gyroscope, and the like. Various sensor types that may also be used are also known in the field of robotics.

Examples of possible motion modules, motion-restriction modules, and motion-guiding modules are already described above. These modules as described can be based upon exertion of mechanical forces, or be based upon electromagnetic forces, chemical forces, physical forces, using for instance "van der Waals" forces, "Casimir forces", based upon surface tension, vacuum or air pressure, and the like.

Data processing unit 100 may for instance be a computer having various components known in computers, like memory, an arithmetic processor, data busses, end the like. Data processing unit 100 may be able to control the other parts in the element 1. It may even control at least part of at least one other element. For instance, in a master-slave setting state. It may also coordinate cooperation between elements 1. It may run a computer program. It may process instructions provided from an external source.

The various units or components in FIG. 8 are indicated schematically. The units may be incorporated in the element. In an embodiment, one or more units may at least partially be integrated in a face of an element. Furthermore, in an embodiment, one or more units may at least partially be integrated into a single component. Alternatively, at least part of the functionality of the units 100-700 may be incorporated in the form of a computer program product.

Figure 9A:
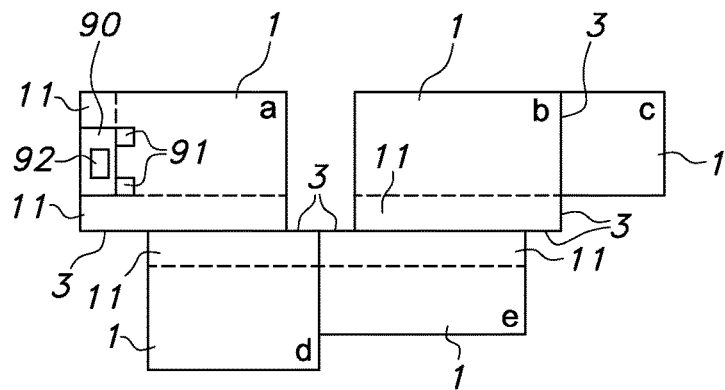

In FIGS. 9A-9K an embodiment of an assembly of elements 1 (labelled 'a'-'e') comprising a shared motion module 90 is illustrated. In the depicted embodiment, the elements do not have the same shape or size. An advantage of a shared motion module is that an assembly of elements can shift shape with the use of a limited number of relatively complex motion modules 90. In FIG. 9A, element 'a' is provided with the shared motion module 90. In an embodiment, shared motion module 90 is temporarily assigned to element 'a'. This may be done by a control structure for assigning the shared motion module, and for controlling the shared motion module 90. Alternatively, the shared motion module 90 is controlled by an element that uses the shared motion module. In yet another embodiment, the shared motion module is self-controlled, of may be part of a peer network together with elements, and even further shared motion modules. The above indicated forms or modes of operation may be combined, or the assembly of elements and one or more shared motion modules may switch from one mode of operation to another. Thus, processing and operation of the motion module may be operated and controlled from the shared motion module 90. Alternatively (and at another end of the spectrum), operation and control of shared motion module 90 is done in an element 1. Operation and processing can also be distributed. Using for instance master-slave settings, control may be switched from element 1 to shared motion module 90 and vice versa. Also, control of a shared motion module may also be switched from one element 1 to another element 1.

Figure 9B:
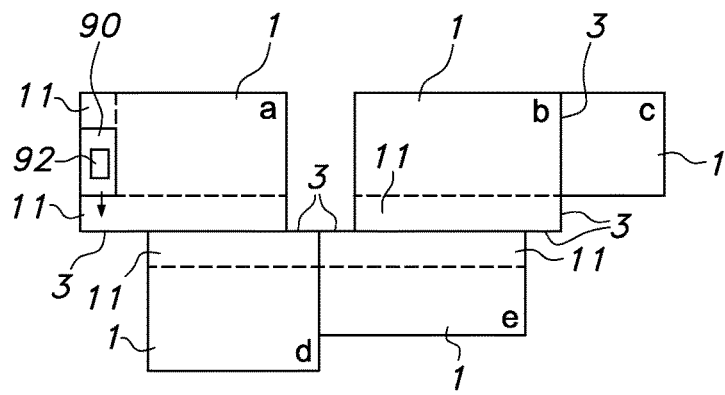
Figure 9C:
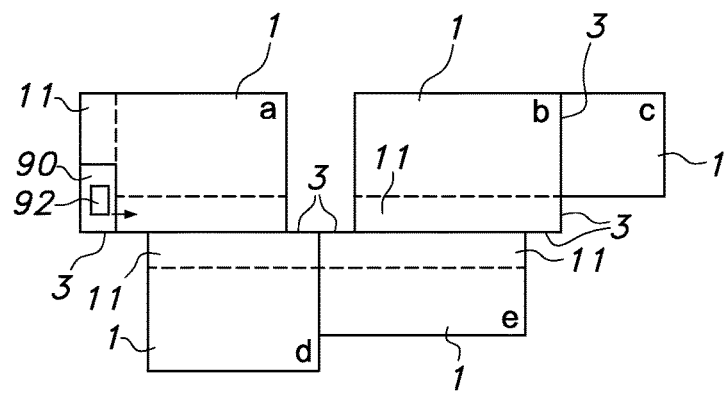
Figure 9D:
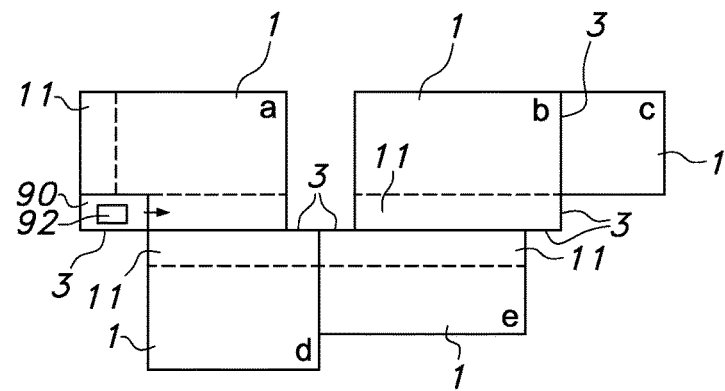
Figure 9E:
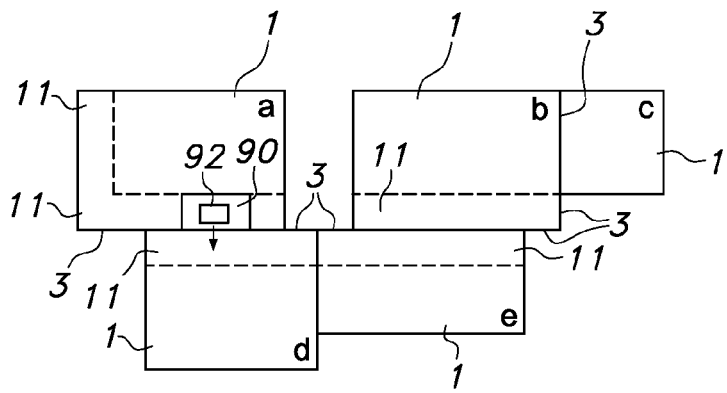
Figure 9F:
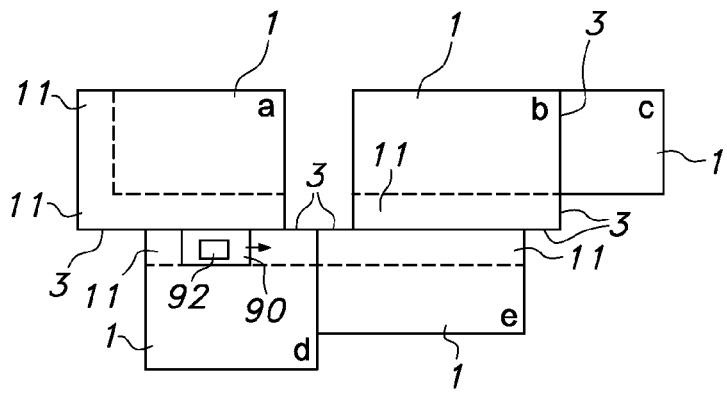
Figure 9G:
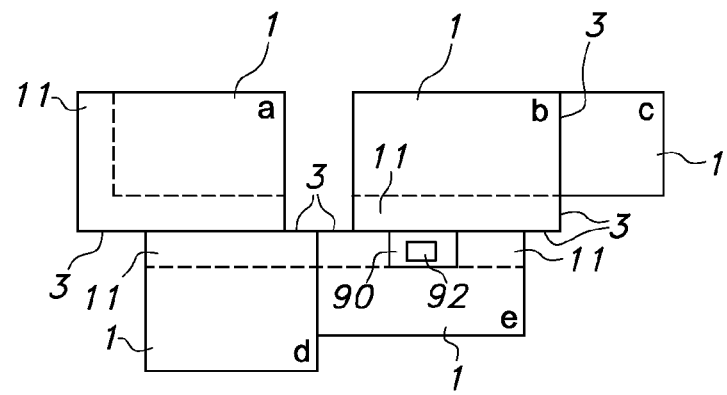

In the current embodiment, the shared motion module 90 comprises attachment parts 91 that engage element 'a'. Shared motion module 90 is in FIG. 9A in its active position. Attachment parts 91 engage element 'a' here in such a way that shared motion module 90 cannot displace with respect to element 'a'. In this active position the shared motion module 90 can be further activated to engage a neighbouring element to start moving element 'a' with respect to such a neighbouring, in particular adjoining, element. Here, no such element is illustrated. The shared motion module 90 is located in a track 11, like for instance a track 11 illustrated in FIG. 4A. In FIG. 9B, the attachment part 91 is pulled in into shared motion module 90. Thus, shared motion module 90 becomes free to move along track 11 of element 'a'. To actually move along track 11 of element 'a', the shared motion module 90 can be provided with a displacement part 92. In an embodiment, displacement part 92 engages in the track 11 of element 'a'. Displacement part 92 may be a mechanical component, physically engaging track 11. For instance, displacement part 92 may comprise driven wheel similar for instance to the motion module of FIGS. 4A-4L, a piezo element illustrated above in a motion module in an element and for instance similar to the embodiments illustrated in FIGS. 6A-7D. Displacement part 92 may also comprise magnet parts that can be activated. The track may be provided with parts that respond to magnetic forces, but that are themselves not permanently magnetic, for instance iron patches. Thus, it is possible to provide a magnetic drive while the elements are themselves not permanently magnetic.

In FIGS. 9B-9G, it is illustrated how displacement part 92 causes shared motion module 90 to travel along tracks 11 of various elements ('a', 'c', 'd') to arrive at an element 1 that is indicated 'e'. When going from FIG. 9C to 9D, the motion module follows track 11, even if the track 11 rounds a corner. When going from FIG. 9E to FIG. 9F, motion module 90 leaves element 'a' and continues its way in track 11 of element 'd'. When going from the situation in FIG. 9F to 9G, motion module 90 first follows track 11 of element 'd', and goes to track 11 of element 'e'. These tracks 11 here connect to one another and for the motion module 90 present one continuous track 11.

Figure 9H:
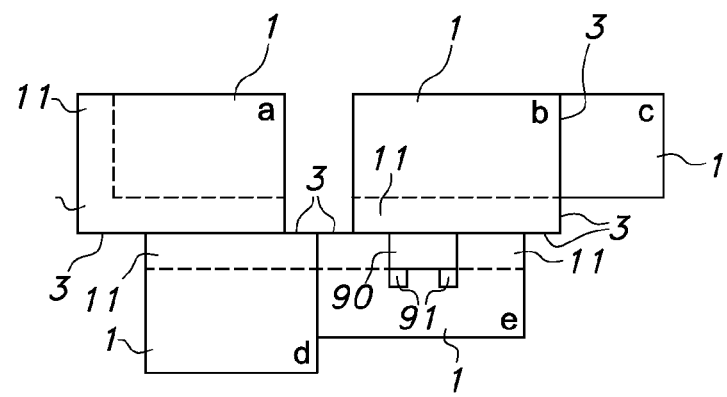

In FIG. 9H, it is illustrated that shared motion module 90 activates its attachment parts 91 to engage element 'e'. Thus, the position of the shared motion module 90 on element 'e' is fixed or locked through attachment part(s) 91. Here, the attachment parts 91 are illustrated at one sided of shared motion module 90. As is evident when looking at FIGS. 9A and 9H, the attachment parts 91 can engage motion module 90 from various sides. Here two sides are illustrated. In an embodiment, the attachment parts 91 are designed to allow engagement of all sides of motion module 90. Alternatively, the attachment parts 91 are not incorporated in the motion module 90 itself, but may be part of the motion module that is integrated in an element. For instance, the attachment part 91 may be designed along the lines of the motion restriction module shown in FIGS. 6A-6D. In fact, it may even be possible to provide a part that is allowed to function as motion restriction module, and as attachment part for motion module 90.

In FIG. 9H the displacement part 92 is not indicated, in order to illustrate that it is no longer functional as of this stage.

In an embodiment, like for instance shown in FIG. 7A, an element 1 comprises two crossing motion guiding modules 11, each motion guiding module 11 going around the element 1. In such an embodiment, two types of shared motion modules may be defined, one type of motion module for a first motion guiding module 11 and another for a second motion guiding module 11. These types of motion modules 90 and motion guiding modules 11 may be identical, but oriented differently.

Figure 9I:
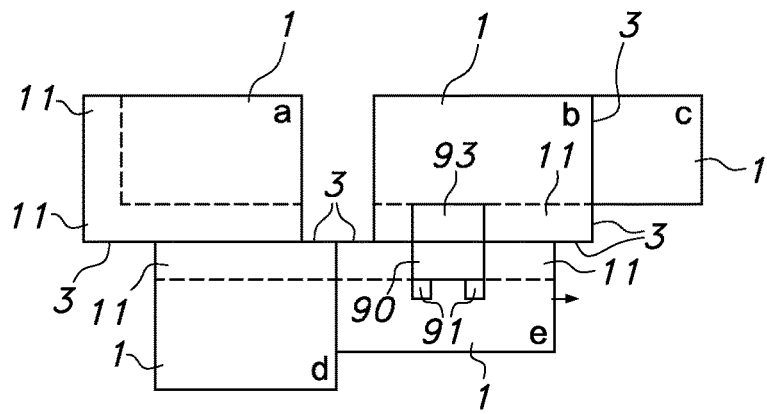
Figure 9J:
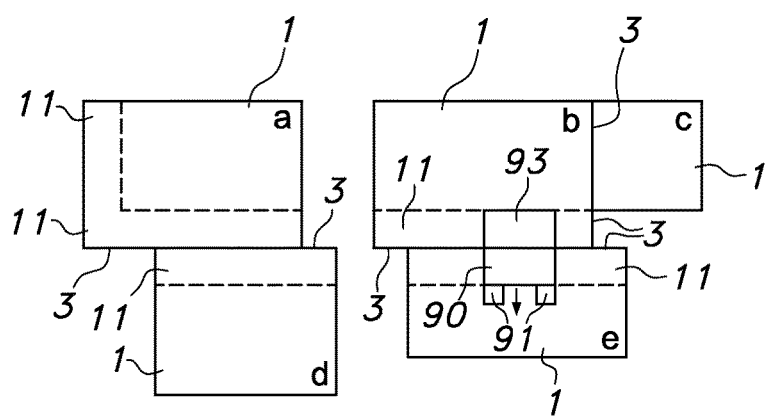
Figure 9K:
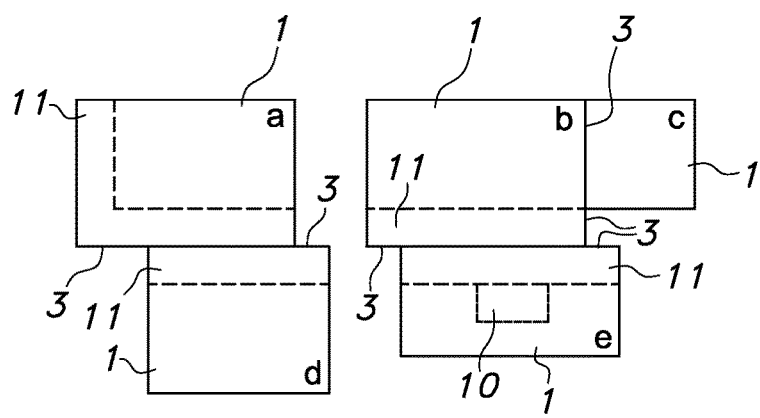

In FIG. 9I, it is illustrated how element displacement part 93 is activated into its active position. The element displacement part 93 extends from shared motion module 90 and from element 'e' into the motion guiding module, here track 11, of element 'b'. Again, the element displacement part 93 can be similar to the types illustrated in FIGS. 4A-7D, i.e., based on mechanical operation, like a wheel, a toothed gear, or the like, magnetically/activated operated elements, or for instance piezo-type elements. The element displacement part 93 now engages into track 11 of element 'b'. It starts exerting force on element 'b' via engagement of track 11. Consequently, element 'd.' displaces with respect to element 'b'. FIG. 9J illustrates this. Next, in an embodiment shown in FIG. 9K, the shared motion module 90 is stored in a storage space in an element, here element 'd.'. Thus, the tracks 11 are free, and shared motion module 90 may be in a position to be charged, or to be protected against environmental influences.

In an embodiment, the displacement part 92 and element displacement part 93 may functionally be combined.

Figure 10A:
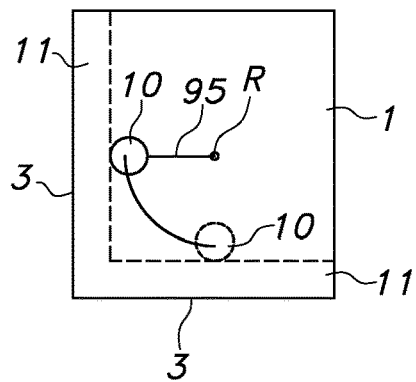
Figure 10B:
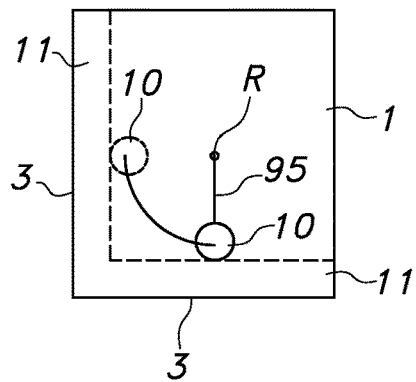
Figure 10C:
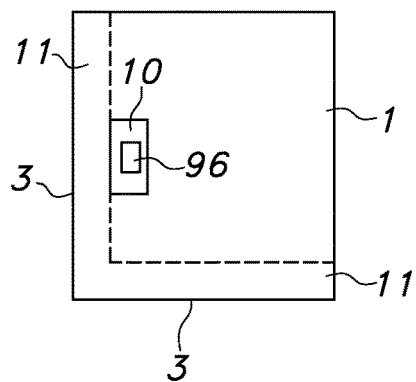
Figure 10D:
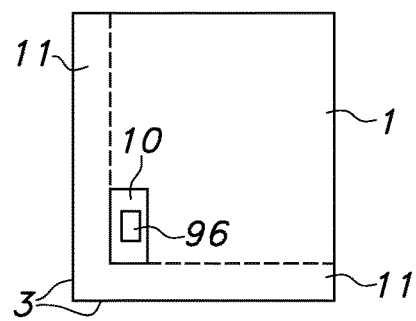
Figure 10E:
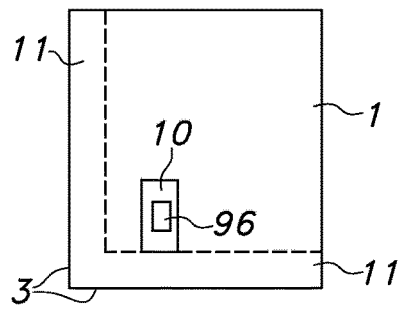

In FIGS. 10A-10H, another concept of an element 1 with a motion module 10 is presented schematically. In this concept, which may be combined with previous concepts, an element 1 has at least one motion module 10 and a motion module movement part 95 allowing displacement or change of orientation of the motion module 10 in an element 1. In this way, the number of motion modules 10 in an element 1 can be considerably reduced. In an embodiment, an element 1 comprises one motion module 10 that comprises a motion module movement part 95 that allows a motion module to be displaced or repositioned to have an active position at each face 3. Thus, only one motion module 10 can be sufficient of displacing an element 1 with respect to another element 1. In fact, more than one motion module 10 may be included in an element 1. In FIGS. 10A and 10B, an embodiment of such a motion module 10 is illustrated that comprises a motion module movement part 95 that allows rotation of the motion module 10 inside the element 1. In that way, motion module 1 that is at an active position at a face 3, allowing engagement of an adjoining element (not shown) that rests against the surface of face 3. In FIG. 10B, motion module 10 is rotated about rotation axis R to an active position at the adjacent face 3 of element 1.

In FIGS. 10C-10H, an alternative embodiment for the motion module 10 with an alternative motion module movement part 96 is illustrated. In this embodiment, motion module 10 moves parallel to motion guiding module 11. It is within motion guiding module 11. Motion module 10 in this embodiment comprises a motion module movement part 96 that allows displacement of motion module 10 as indicated in subsequent FIGS. 10C-10G. The motion module 10 moves or displaces from its position in FIG. 10C to its position in FIG. 10D parallel to motion guiding module 11, here track 11. Motion module 10 here displaces inside element 1. Here motion module 10 moves or displaces between the centre point of the element and track 11, leaving track 11 free. The motion module may be actuated via exertion of a mechanical force. Examples are illustrated above. Alternatively, electromagnetical force may be used. An example of this is also illustrated above. In this way, an element may comprise as little as one motion module 10, reducing complexity o an element. It may me possible to equip an element 1 with several motion modules.

Figure 10F:
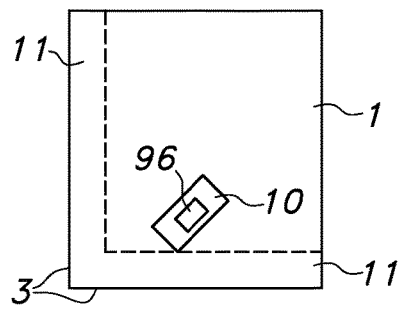

In FIG. 10F, motion module 10 is moved to come into its working position. In this embodiment, the motion module has a working position. In other embodiments, the motion module may be designed to move in more than one orientation.

Figure 10G:
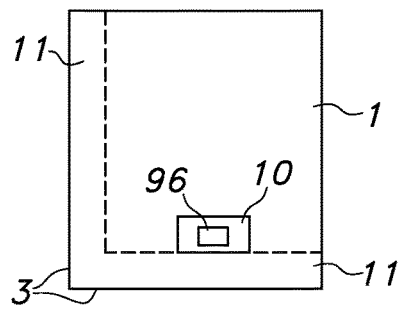
Figure 10H:
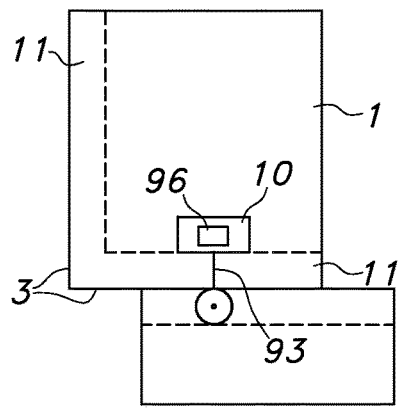

In FIG. 10G, motion module 10 is at its new active position at adjacent face 3. There, motion module 10 may be locked in its position in element 1. In FIG. 10H, schematically, motion module 10 released an element displacement part 93. In this embodiment, it may comprise a driven wheel, like the embodiment of FIGS. 4A-4L. Other element displacement parts 93 may also be conceivable, for instance the piezo element described above, or the magnetic parts described earlier. This embodiment may considerably simplify elements 1, as the may comprise as little as one motion module 10 in an element 1. The motion module may comprise part of the elements functional parts. In one extreme example, the motion module 10 comprises all the functional parts (FIG. 8) of the element 1.

The embodiment of FIGS. 10A-10H may be combined with the embodiment of FIGS. 9A-9K. For instance, an element may comprise one or more internally displaceable motion modules 10, in combination with one ore more shared motion modules in an object. In an other embodiment, a motion module can be both an internal motion module, and it may function as a shared motion module 10.

FIG. 11 shows schematically a further or alternative embodiment of an element 1. In this embodiment, a hand 51 is about to grab the element 1 in order to displace it. This embodiment of an element 1 can have one or more of the features described, or a combination thereof. Alternatively, it may comprise only a sensor for grab-detection and holding means. In FIG. 11, schematically an embodiment of an element is shown with a motion module 10, motion guiding module 20 and motion restriction module 30 schematically indicated. In this schematic indication, a mechanical embodiment is shown which may be like the embodiment of FIG. 4, or the embodiment of FIG. 9 or of the FIG. 10. The element 1 of this embodiment can be a building block and in this embodiment has a cubic shape, although, as already explained earlier, other shapes may also be considered. In fact, it may also be possible to use a set of shapes, like the different bricks in an old-fashioned box of bricks used as a child's toy.

The element 1 of FIG. 11 basically can be picked, put and stacked like the bricks of a set of bricks, or like the well-known Lego®. Element 1 comprises in this embodiment a set of sensors 400 for grab detection. These sensors 400 can for instance be proximity sensors, heat sensors, or camera's, and make up a sensing means. In an embodiment allowing easy grab-detection, the sensor 400 comprise camera's, for instance cameras that are provided on each face 3 of the element 1. In this way, it can be possible to detect for instance a hand 51 approaching the element 1.

The element 1 further comprises holding means 50. In this embodiment, element 1 has a set of holding modules 50. Here, holding modules are provided on each face 3. In this way, an element 1 can be locked face to face with another, similar element. An example is for instance the locking as described in FIG. 3F. More specifically, in this embodiment, each face 3 comprises a subset of, here four, holding modules 50. Here, holding modules 50 are provided on each quadrant of a face 3. In this way, element 1 can be locked onto another, similar element with one quadrant onto another quadrant, allowing flexible building of bricks or blocks. Furthermore, the bonds referred to before may be realised in that way.

The sensors 400 can be functionally coupled to a data processor 100 (not shown). In this way, the input of at least two sensors on different faces 3 can be combined in a more versatile grab-detection. For instance, with a camera on each face 3 having viewing angels that for instance at least stitch together, it may be possible to have all-around grab-detection. In fact, when detecting approaching of a hand or fingers at two different faces, the prediction and anticipation of a grabbing of element 1 can be improved. In such a setting, each camera can have a viewing angle of more than 45°. In particular, the viewing angle of each camera can be more than 90°. In this way, an all-around view can be accomplished with a camera on each surface of a cube easily, from a distance of about 8 cm or less already. One or more of the surfaces of an element may be curved. In this respect, a convex curvature is referred to. Most extreme examples include a sphere and a cylinder. A sphere, in this respect, has one curved surface. A cylinder, in particular a circle cylinder with circle end planes, has three faces. In such shapes, for instance, a smaller amount of camera's may be required for grab detection. For instance grab detection at a distance from about 5 cm.

Using a data processor, for instance data processor 100, image processing on the images of the camera's may be done, and image interpretation using known image-interpretation routines.

Furthermore, the holding modules 50 can also be functionally coupled to data processor 100. In this way, the grab-detection of one or more sensors 400 can be combined and coupled with a locking and/or unlocking action of one or more holding modules 50. Element 1 may also upon grab-detection contact one or more similar elements that are locked to element 1, and request being unlocked or request being locked, depending upon its current state.

In an embodiment, element 1 is allowed to anticipate being grabbed, or anticipate being released from being grabbed: When one or more of the sensors 400 sense a hand 51 approaching element 1 for grabbing element 1, the holding modules 50 can unlock. This allows the hand to grab element 1 and actually pick it up and remove it from other elements. The other way around, when the element 1 is held by a hand 51 and placed upon one or more similar elements with one or more holding modules functionally aligned, the one or more holding modules may, in anticipation, start locking. In this respect, holding modules of opposite faces are functionally aligned when the holding modules are capable of exerting a locking force at one another. Mechanically-operating holding modules of opposite faces, for instance, may be self-searching or self-tapping. For instance, the entrance of a holding module may be conical, for guiding an inserting end towards a centre.

The holding modules 50 allow exerting a force to and/or receiving a force from one or more holding module or other, similar elements. In particular, the holding modules 50 allow a force with a component normal to face 3, and directed towards the face 3. In this way, using one or more holding modules 50, element 1 can be (face) locked to one or more other, similar elements. The exerted force may be for instance magnetic, electrical, mechanically.

In an embodiment, the holding modules are mechanical parts that allow exertion of mechanical forces. For instance, each holding module 50 may comprise a treaded end that can be extended and be received in an other, similar holding module. Such a treaded end may for instance be hollow. This may allow alignment control, or signal transmission from one element to another. Alternatively, holding module 50 may comprise a hooking part which can be hooked in (and released from) a receiving part. In an embodiment, a holding module 50 can be male, female, unisex, or can be "hermaphrodite". This may allow a holding module 50 to lock into another holding module, or to be locked by another holding module.

In the embodiment discussed, the one or more sensors 400 are functionally coupled to one or more holding modules 50. This allows the holding modules 50 to respond to sensor measurements, like grab-detection. Thus, for instance, element 1 can unlock before it is actually touched by a hand 51, allowing element 1 to be picked up and displaced. In may also or in combination allow element 1 to lock to one or more other, similar elements even before it is released by hand 51. This gives element 1 a sense of "responsiveness". In an embodiment, no force needs to be exerted to lock elements, and no additional action may be needed for taking one or more elements away.

In an embodiment, element 1 comprises a frame structure (not shown) holding the sensors 400, and supporting the holding modules 50. Furthermore, such a frame structure may provide support or define a face. In a minimal way, it may provide three supports defining a face. It may also provide or support a surface defining a face 3. The frame structure may be from any material, like polymer, reinforced polymer, metal, combinations thereof, and the like. A skilled person will recognize suitable materials. The frame structure may be produced using any type or production method, including 3D printing.

The sensing means, in particular a camera, comprises a field of view. In such a field of view, one or more detection cones may be defined. In the embodiment of FIG. 11, two cameras can comprise a first detection cone and a second detection cone. In the process of grab detection, detection cones that are opening in substantially opposite directions may be involved. Alternatively of in combination, detection cones may have an axis which are under an angle of at least 90 degrees. Furthermore, the holding means is adapted for providing a holding force having a component of the holding force directed to and perpendicular to a connecting line of these detection cones.

The axes of two detection cones of sensor involved in grab-detection may define a plane. Upon grab detection, the holding means that are actuated are adapted to exert a force having a component normal to that plane. The force is often directed towards the element.

In an embodiment, the first and second detection cone comprise a connecting line, and the holding means is adapted for providing a holding force having a component directed to and perpendicular to the connecting line.

In an embodiment, the sensing means furthermore is adapted for detecting alignment of said holding means with a holding means of a similar element. The sensing means may provide a measure of the distance from actual alignment of opposite holding means.

Elements may have a different shape and/or be of a different type. The sensing means may be adapted to determine the type and/or shape of the an other element. The sensing means may be adapted for measuring or sensing proximity other element. In case of an element according to FIG. 11, and with the sensing means comprising a camera at each face having a viewing angle allowing a detection cone opening away from the face, for instance having an axis normal to a face, the parameters mentioned can be determined.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMERALS 1 element
2 centre of an element
3 face of an element
10 motion module
11 motion module: track part
12 slidable cover
14 motion guiding/motion restriction module
15 motion guiding/motion restriction module
20 motion guiding module
21 straight pin
22 groove
30 motion restriction module
31 pin
32 slot
34 cam
35 undercut opening in slot 32
50 holding modules
51 hand
70 piezo module
71 leg
72 piezo piece
73 piezo element
80 rail
82 undercut groove
90 (shared) motion module
91 Attachment part(s)
92 displacement part
93 element displacement part
95 motion module movement part
96 motion module movement part
100 data processing unit
200 data communication unit
300 energy unit
400 sensor unit
500 motion module
600 motion restriction unit
700 motion guiding module

What is claimed is:

1. A three-dimensional element, comprising:
a centre point in said element;
at least three faces coupled to said centre point;
holding means, adapted for interacting with a functionally aligned other holding means of a similar element, and comprising a holding state and a released state, said holding means in said holding state engaged with said aligned holding means of said similar element for holding said element positioned with respect to said similar element, and in said released state disengaged with said aligned holding means, said holding means including at least one holding module having a first holding module part and a second holding module part adapted to exert a force to one another for holding faces positioned, said first holding module part and said second holding module part being provided on faces of said holding module, to allow each face of said holding module to be held in position with respect to a facing face provided with said holding module, with said first holding module part of a face interacting with the second holding module part of another facing face; and
sensing means for providing grab-detection, said grab-detection including detection of one selected from an action leading to a grip of said element, an actual grip of said element with subsequently a release of a grip of said element, said sensing means including a first sensor and a second sensor, with said first sensor coupled to a second face of said at least three faces and said second sensor coupled to a third face of said at least three faces,
wherein:
said sensing means is functionally coupled to said holding means such that upon said grab-detection, actuating at least one of said functionally-aligned holding means between said holding state and said released state,
said holding means is coupled to a first face of said at least three faces, and adapted for interacting with said functionally aligned holding module of a facing face of a similar element, for in said holding state, is to hold said first face positioned with respect to said facing face, and in said released state, is to not hold said first face positioned with respect to said facing face,
said at least two sensors are functionally coupled with said holding means of said first face, for upon said grab-detection, is to actuate said holding modules of said facing face between said holding state and said released state,
said holding means is actuated from said holding state to said released state when said grab-detection includes said action leading to a grip of said element, and said holding means is actuated from said released state to said holding state when said grab-detection includes said action of releasing a grip of said element,
said first sensor and said second sensor are functionally coupled with one another for providing said grab-detection, said first sensor and said second sensor being time-correlated for providing said grab-detection, said first sensor, said second sensor, and said holding modules being functionally coupled such that upon said grab-detection, is to actuate said holding modules between said holding state and said released state, and the sensing means have a time frame for detection of actions of grabbing of less than 2 minutes.

2. The element of claim 1, wherein said sensing means are further adapted for determining a distance to a similar element.

3. The element of claim 1, wherein said sensing means comprise optical sensors with spatial resolution, in particular cameras, each camera comprising a field of view comprising a detection cone.

4. The element of claim 1, wherein said sensing means is adapted for alignment detection of said holding modules with holding modules of facing faces.

5. The element of claim 1, wherein said holding module comprises a holding state in which the holding module holds faces positioned, and a released state in which faces can move with respect to one another.

6. The element of claim 1, wherein a detection range of said sensing means for grab-detection is less than 50 cm.

7. The element of claim 1, wherein the element is used in one selected from a game, a toy, an educational construction set, and a medical rehabilitation aid.

8. A system, comprising:
a motion module; and
at least a first element, a second element, and a third element, each of the first element, the second element, and the third element being three-dimensional, and including:
  holding means, adapted for interacting with a functionally aligned other holding means of a similar element, and comprising a holding state and a released state, said holding means in said holding state engaged with said aligned holding means of said similar element for holding said element positioned with respect to said similar element, and in said released state disengaged with said aligned holding means, and
  sensing means for providing grab-detection, said grab-detection including detection of one selected from an action leading to a grip of said element, an actual grip of said element with subsequently a release of a grip of said element;
  a centre point in said element;
  at least one face coupled to said centre point, said at least one face including a motion-guiding module, defining a trajectory over at least part of said face, and a motion-restriction module, adapted for limiting the displacement of said centre point with respect to said centre point of one of the other elements to at least one trajectory selected from the group consisting of said trajectory and said trajectory of said other element, when interacting with said motion module,
wherein said sensing means is functionally coupled to said holding means for upon said grab-detection actuating at least one of said functionally aligned holding means between said holding state and said released state,
wherein said motion module is adapted to be coupled to a face of one of said elements, and adapted for displacing said centre point of said one element with respect to said centre point of one of the other elements when interacting with the motion-guiding module of said one of the other elements, said motion-guiding module, said motion module and said motion-restriction module defining different module types, wherein for displacing said centre point of said first element away from said centre point of said second element and towards said centre point of said third element, a first face of said at least one face of said first element faces at least one of a second face of said at least one face of said second element and a third face of said at least one face of said third element, thus providing facing faces, and wherein for said displacing, said motion module interacts with at least one motion-guiding module, and with at least one motion-restriction module, with said facing faces providing said interacting modules while displacing, at least one module of said first face interacts with at least one module of at least one different module type of at least one other of said facing faces while displacing, and said at least one module of said first face interacts with at least one module of a different module type of said second face and at least one module of a different module type of said third face, wherein said modules of said first face, said second face, and said third face interact alternatingly while displacing.

9. The system of claim 8, wherein said first face changes its interacting module for said displacing.

10. The system of claim 8, wherein while displacing, said motion module is coupled to said first face.

11. The system of claim 8, wherein at least one module of said second face and at least one module of said third face interact with a different module of said first face while displacing.

12. The system of claim 8, wherein said modules of said second face and said third face interact one after the other with a different module of said first face for said displacing.

13. The system of claim 8, wherein each of said elements comprise a motion module.

14. The system of claim 8, wherein each of said at least one face of said elements comprises a motion module.

15. The system of claim 8, wherein each element comprises at least two of said faces.

16. The system of claim 8, wherein said sensing means are adapted for measuring a distance from an element to a neighbouring element along said trajectory.

17. A system, comprising:
a motion module; and
at least a first element, a second element, and a third element, each of said first element, said second element, and said third element including:
  holding means, adapted for interacting with a functionally aligned other holding means of a similar element, and comprising a holding state and a released state, said holding means in said holding state engaged with said aligned holding means of said similar element for holding said element positioned with respect to said similar element, and in said released state disengaged with said aligned holding means, and
  sensing means for providing grab-detection, said grab-detection including detection of one selected from an action leading to a grip of said element, an actual grip of said element with subsequently a release of a grip of said element;
  a centre point in said element;

at least one face coupled to said centre point, said face including a motion-guiding module, defining a trajectory over at least part of said face, and a motion-restriction module, adapted for limiting the displacement of said centre point with respect to said centre point of one of the other elements to at least one trajectory selected from the group consisting of said trajectory and said trajectory of said other element, when interacting with said motion module;

wherein said sensing means is functionally coupled to said holding means for upon said grab-detection actuating at least one of said functionally aligned holding means between said holding state and said released state, wherein said motion module is adapted to be coupled to a face of one of said elements, and adapted for displacing said centre point of said one element with respect to said centre point of one of the other elements when interacting with the motion-guiding module of said one of the other elements, said motion-guiding module, said motion module and said motion-restriction module defining different module types, wherein for displacing said centre point of said first element away from said centre point of said second element and towards said centre point of said third element, a first face of said at least one face of said first element faces at least one of a second face of said at least one face of said second element and a third face of said at least one face of said third element, thus providing facing faces, and wherein for said displacing, said motion module interacts with at least one motion-guiding module, and with at least one motion-restriction module, with said facing faces providing said interacting modules while displacing, at least one module of said first face interacts with at least one module of at least one different module type of at least one other of said facing faces while displacing, and said at least one module of said first face interacts with at least one module of a different module type of said second face and at least one module of a different module type of said third face, wherein said modules of said first face, said second face, and said third face interact alternatingly while displacing.

18. The system of claim 17, wherein said first face changes its interacting module for said displacing.

19. The system of claim 17, wherein while displacing, said motion module is coupled to said first face.

20. The system of claim 17, wherein at least one module of said second face and at least one module of said third face interact with a different module of said first face while displacing.

21. The system of claim 17, wherein said modules of said second face and said third face interact one after the other with a different module of said first face for said displacing.

22. The system of claim 17, wherein each of said elements comprise a motion module.

23. The system of claim 17, wherein each of said at least one face of said elements comprises a motion module.

* * * * *